US010322375B2

(12) United States Patent
Swiatek et al.

(10) Patent No.: US 10,322,375 B2
(45) Date of Patent: Jun. 18, 2019

(54) AERATION DEVICE FOR FILTRATION SYSTEM

(71) Applicant: Evoqua Water Technologies LLC, Pittsburgh, PA (US)

(72) Inventors: Tomasz Swiatek, Baulkham Hills (AU); Zhiyi Cao, Lidcombe (AU); Bruce Gregory Biltoft, Chatswood (AU); Lisa Kathleen Leckie, McGraths Hill (AU); Huw Alexander Lazaredes, Woolloomooloo (AU)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

(21) Appl. No.: 15/744,134

(22) PCT Filed: May 16, 2016

(86) PCT No.: PCT/US2016/032633
§ 371 (c)(1),
(2) Date: Jan. 12, 2018

(87) PCT Pub. No.: WO2017/011068
PCT Pub. Date: Jan. 19, 2017

(65) Prior Publication Data
US 2018/0200674 A1     Jul. 19, 2018

(30) Foreign Application Priority Data

Jul. 14, 2015   (AU) .............................. 2015902777

(51) Int. Cl.
*B01D 65/08* (2006.01)
*B01D 61/20* (2006.01)
*B01D 63/04* (2006.01)

(52) U.S. Cl.
CPC .............. *B01D 61/20* (2013.01); *B01D 63/04* (2013.01); *B01D 65/08* (2013.01);
(Continued)

(58) Field of Classification Search
CPC .... B01D 65/02; B01D 65/08; B01D 2313/26; B01D 2313/10; B01D 2313/105;
(Continued)

(56) References Cited

U.S. PATENT DOCUMENTS 256,008 A    4/1882  Leak
285,321 A    9/1883  Tams
(Continued)

FOREIGN PATENT DOCUMENTS

AU    34400/84 A   4/1985
AU    77066/87 A   2/1988
(Continued)

OTHER PUBLICATIONS

International Preliminary Report on Patentability in corresponding PCT/US2016/032633, dated Jan. 16, 2018.
(Continued)

*Primary Examiner* — Pranav N Patel

(57) ABSTRACT

An aeration device configured to be fitted to a membrane filtration module having membranes mounted therein. The aeration device comprises a sleeve configured to at least partially surround the membrane filtration module. The sleeve has one end adapted to engage with the membrane filtration module and another end adapted to engage with a filtrate collection conduit or manifold.

16 Claims, 10 Drawing Sheets

(52) U.S. Cl.
CPC ...... *B01D 2313/26* (2013.01); *B01D 2315/06* (2013.01); *B01D 2321/185* (2013.01)

(58) Field of Classification Search
CPC ............ B01D 2313/08; B01D 2313/21; B01D 2321/18; B01D 2321/185; B01D 63/02; B01D 63/046; B01D 2315/06; C02F 3/1273; C02F 3/20; C02F 3/201; C02F 3/208
See application file for complete search history.

(56) References Cited

U.S. PATENT DOCUMENTS

| | | | |
|---|---|---|---|
| 403,507 A | 5/1889 | Bode | |
| 511,995 A | 1/1894 | Buckley | |
| 1,994,135 A | 3/1935 | Horowitz | |
| 1,997,074 A | 4/1935 | Novotny | |
| 2,080,783 A | 5/1937 | Petersen | |
| 2,105,700 A | 1/1938 | Ramage | |
| 2,658,045 A | 11/1953 | Schildknecht | |
| 2,843,038 A | 7/1958 | Manspeaker | |
| 2,926,086 A | 2/1960 | Chenicek et al. | |
| 3,068,655 A | 12/1962 | Murray et al. | |
| 3,139,401 A | 6/1964 | Hach | |
| 3,183,191 A | 5/1965 | Hach | |
| 3,191,674 A | 6/1965 | Richardson | |
| 3,198,636 A | 8/1965 | Bouthilet | |
| 3,216,983 A | 11/1965 | Levenson | |
| 3,228,876 A | 1/1966 | Mahon | |
| 3,246,761 A | 4/1966 | Bryan et al. | |
| 3,275,554 A | 9/1966 | Wagenaar | |
| 3,373,056 A | 3/1968 | Martin | |
| 3,421,354 A | 1/1969 | Strybel | |
| 3,435,893 A | 4/1969 | Withers | |
| 3,442,002 A | 5/1969 | Geary et al. | |
| 3,462,362 A | 8/1969 | Kollsman | |
| 3,472,168 A | 10/1969 | Inoue et al. | |
| 3,472,765 A | 10/1969 | Budd et al. | |
| 3,492,698 A | 2/1970 | Geary et al. | |
| 3,494,780 A | 2/1970 | Skiens | |
| 3,501,798 A | 3/1970 | Carraro | |
| 3,505,215 A | 4/1970 | Bray | |
| 3,556,305 A | 1/1971 | Shorr | |
| 3,563,860 A | 2/1971 | Henderyckx | |
| 3,591,010 A | 7/1971 | Pall et al. | |
| 3,592,450 A | 7/1971 | Rippon | |
| 3,625,827 A | 12/1971 | Wildi et al. | |
| 3,628,775 A | 12/1971 | McConnell et al. | |
| 3,654,147 A | 4/1972 | Levin | |
| 3,679,052 A | 7/1972 | Asper | |
| 3,689,009 A | 9/1972 | Terrell | |
| 3,693,406 A | 9/1972 | Tobin, III | |
| 3,700,561 A | 10/1972 | Ziffer | |
| 3,700,591 A | 10/1972 | Higley | |
| 3,708,071 A | 1/1973 | Crowley | |
| 3,728,256 A | 4/1973 | Cooper | |
| 3,763,055 A | 10/1973 | White et al. | |
| 3,791,631 A | 2/1974 | Meyer | |
| 3,795,609 A | 3/1974 | Hill et al. | |
| 3,804,258 A | 4/1974 | Okuniewski et al. | |
| 3,827,566 A | 8/1974 | Ponce | |
| 3,843,809 A | 10/1974 | Luck | |
| 3,864,289 A | 2/1975 | Rendall | |
| 3,876,738 A | 4/1975 | Marinaccio et al. | |
| 3,886,066 A | 5/1975 | Chen et al. | |
| 3,912,624 A | 10/1975 | Jennings | |
| 3,937,015 A | 2/1976 | Akado et al. | |
| 3,955,998 A | 5/1976 | Clampitt et al. | |
| 3,968,192 A | 7/1976 | Hoffman, III et al. | |
| 3,982,095 A | 9/1976 | Robinson | |
| 3,992,301 A | 11/1976 | Shippey et al. | |
| 3,993,816 A | 11/1976 | Baudet et al. | |
| 4,016,078 A | 4/1977 | Clark | |
| 4,033,817 A | 7/1977 | Gregor | |
| 4,049,765 A | 9/1977 | Yamazaki | |
| 4,076,656 A | 2/1978 | White et al. | |
| 4,082,683 A | 4/1978 | Galesloot | |
| 4,105,556 A | 8/1978 | O'Amaddio et al. | |
| 4,105,731 A | 8/1978 | Yamazaki | |
| 4,107,043 A | 8/1978 | McKinney | |
| 4,130,622 A | 12/1978 | Pawlak | |
| 4,138,460 A | 2/1979 | Tigner | |
| 4,142,526 A | 3/1979 | Zaffaroni et al. | |
| 4,157,899 A | 6/1979 | Wheaton | |
| 4,169,873 A | 10/1979 | Lipert | |
| 4,183,890 A | 1/1980 | Bollinger | |
| 4,187,263 A | 2/1980 | Lipert | |
| 4,188,817 A | 2/1980 | Steigelmann | |
| 4,190,411 A | 2/1980 | Fujimoto | |
| 4,190,419 A | 2/1980 | Bauer | |
| 4,192,750 A | 3/1980 | Elfes et al. | |
| 4,193,780 A | 3/1980 | Cotton, Jr. et al. | |
| 4,203,848 A | 5/1980 | Grandine, II | |
| 4,204,961 A | 5/1980 | Cusato, Jr. | |
| 4,218,324 A | 8/1980 | Hartmann et al. | |
| 4,226,921 A | 10/1980 | Tsang | |
| 4,227,295 A | 10/1980 | Bodnar et al. | |
| 4,230,583 A | 10/1980 | Chiolle et al. | |
| 4,243,525 A | 1/1981 | Greenberg | |
| 4,247,498 A | 1/1981 | Castro | |
| 4,248,648 A | 2/1981 | Kopp | |
| 4,253,936 A | 3/1981 | Leysen et al. | |
| 4,271,026 A | 6/1981 | Chen et al. | |
| 4,272,379 A | 6/1981 | Pollock | |
| 4,278,548 A | 7/1981 | Bettinger et al. | |
| 4,302,336 A | 11/1981 | Kawaguchi et al. | |
| 4,315,819 A | 2/1982 | King et al. | |
| 4,323,453 A | 4/1982 | Zampini | |
| 4,340,479 A | 7/1982 | Pall | |
| 4,350,592 A | 9/1982 | Kronsbein | |
| 4,353,802 A | 10/1982 | Hara et al. | |
| 4,354,443 A | 10/1982 | Abrahamson | |
| 4,359,359 A | 11/1982 | Gerlach et al. | |
| 4,367,139 A | 1/1983 | Graham | |
| 4,367,140 A | 1/1983 | Wilson | |
| 4,369,605 A | 1/1983 | Opersteny et al. | |
| 4,371,427 A | 2/1983 | Holler et al. | |
| 4,384,474 A | 5/1983 | Kowalski | |
| 4,385,150 A | 5/1983 | Miyake et al. | |
| 4,388,189 A | 6/1983 | Kawaguchi et al. | |
| 4,389,363 A | 6/1983 | Molthop | |
| 4,405,688 A | 9/1983 | Lowery et al. | |
| 4,407,975 A | 10/1983 | Yamaguchi | |
| 4,414,113 A | 11/1983 | LaTerra | |
| 4,414,172 A | 11/1983 | Leason | |
| 4,415,452 A | 11/1983 | Heil et al. | |
| 4,431,545 A | 2/1984 | Pall et al. | |
| 4,439,217 A | 3/1984 | Yamabe et al. | |
| 4,451,369 A | 5/1984 | Sekino et al. | |
| 4,462,855 A | 7/1984 | Yankowsky et al. | |
| 4,467,001 A | 8/1984 | Coplan et al. | |
| 4,476,015 A | 10/1984 | Schmitt et al. | |
| 4,476,112 A | 10/1984 | Aversano | |
| 4,491,522 A | 1/1985 | Ishida et al. | |
| 4,496,470 A | 1/1985 | Kapiloff et al. | |
| 4,511,471 A | 4/1985 | Muller | |
| 4,519,909 A | 5/1985 | Castro | |
| 4,539,940 A | 9/1985 | Young | |
| 4,540,490 A | 9/1985 | Shibata et al. | |
| 4,545,862 A | 10/1985 | Gore et al. | |
| 4,547,289 A | 10/1985 | Okano et al. | |
| 4,559,139 A | 12/1985 | Uemura et al. | |
| 4,609,465 A | 9/1986 | Miller | |
| 4,610,789 A | 9/1986 | Barch | |
| 4,614,109 A | 9/1986 | Hofmann | |
| 4,618,533 A | 10/1986 | Steuck | |
| 4,623,460 A | 11/1986 | Kuzumoto et al. | |
| 4,623,670 A | 11/1986 | Mutoh et al. | |
| 4,623,690 A | 11/1986 | Patzschke et al. | |
| 4,629,563 A | 12/1986 | Wrasidlo | |
| 4,632,745 A | 12/1986 | Giuffrida et al. | |
| 4,636,296 A | 1/1987 | Kunz | |
| 4,642,182 A | 2/1987 | Drori | |
| 4,647,377 A | 3/1987 | Miura | |

(56) References Cited

U.S. PATENT DOCUMENTS

| | | |
|---|---|---|
| 4,650,586 A | 3/1987 | Ellis, III |
| 4,650,596 A | 3/1987 | Schlueter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,695,592 A | 9/1987 | Itoh et al. |
| 4,702,830 A | 10/1987 | Makino et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,735,261 A | 4/1988 | Huebner |
| 4,737,425 A | 4/1988 | Lin et al. |
| 4,744,240 A | 5/1988 | Reichelt |
| 4,749,487 A | 6/1988 | Lefebvre |
| 4,752,421 A | 6/1988 | Makino |
| 4,756,875 A | 7/1988 | Tajima et al. |
| 4,758,251 A | 7/1988 | Swedo et al. |
| 4,763,612 A | 8/1988 | Iwanami |
| 4,769,140 A | 9/1988 | van Dijk et al. |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,800,019 A | 1/1989 | Bikson et al. |
| 4,810,384 A | 3/1989 | Fabre |
| 4,812,235 A | 3/1989 | Seleman et al. |
| 4,812,269 A | 3/1989 | Harttig et al. |
| 4,824,563 A | 4/1989 | Iwahori et al. |
| 4,828,696 A | 5/1989 | Makino et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,849,106 A | 7/1989 | Mir |
| 4,855,163 A | 8/1989 | Joffee et al. |
| 4,867,883 A | 9/1989 | Daigger et al. |
| 4,876,006 A | 10/1989 | Ohkubo et al. |
| 4,886,601 A | 12/1989 | Iwatsuka et al. |
| 4,886,668 A | 12/1989 | Haslam et al. |
| 4,888,115 A | 12/1989 | Marinaccio et al. |
| 4,889,620 A | 12/1989 | Schmit et al. |
| 4,892,739 A | 1/1990 | Shah et al. |
| 4,904,426 A | 2/1990 | Lundgard et al. |
| 4,908,114 A | 3/1990 | Ayers |
| 4,909,943 A | 3/1990 | Fibiger et al. |
| 4,911,838 A | 3/1990 | Tanaka |
| 4,919,815 A | 4/1990 | Copa et al. |
| 4,931,186 A | 6/1990 | Ford et al. |
| 4,933,084 A | 6/1990 | Bandel et al. |
| 4,952,317 A | 8/1990 | Culkin |
| 4,963,304 A | 10/1990 | Im et al. |
| 4,966,699 A | 10/1990 | Sasaki et al. |
| 4,968,430 A | 11/1990 | Hildenbrand et al. |
| 4,968,733 A | 11/1990 | Muller et al. |
| 4,969,997 A | 11/1990 | Kluver et al. |
| 4,980,066 A | 12/1990 | Slegers |
| 4,988,444 A | 1/1991 | Applegate et al. |
| 4,990,251 A | 2/1991 | Spranger et al. |
| 4,999,038 A | 3/1991 | Lundberg |
| 5,002,666 A | 3/1991 | Matsumoto et al. |
| 5,005,430 A | 4/1991 | Kibler et al. |
| 5,015,275 A | 5/1991 | Beck et al. |
| 5,017,292 A | 5/1991 | DiLeo et al. |
| 5,019,260 A | 5/1991 | Gsell et al. |
| 5,024,762 A | 6/1991 | Ford et al. |
| 5,032,282 A | 7/1991 | Linder et al. |
| 5,034,125 A | 7/1991 | Karbachsch et al. |
| 5,043,113 A | 8/1991 | Kafchinski et al. |
| 5,049,275 A | 9/1991 | Gillberg-LaForce et al. |
| 5,059,317 A | 10/1991 | Marius et al. |
| 5,066,375 A | 11/1991 | Parsi et al. |
| 5,066,401 A | 11/1991 | Muller et al. |
| 5,066,402 A | 11/1991 | Anselme et al. |
| 5,069,065 A | 12/1991 | Sprunt et al. |
| 5,069,353 A | 12/1991 | Espenan |
| 5,075,044 A | 12/1991 | Augem |
| 5,075,065 A | 12/1991 | Effenberger et al. |
| 5,076,925 A | 12/1991 | Roesink et al. |
| 5,079,272 A | 1/1992 | Allegrezza, Jr. et al. |
| 5,080,770 A | 1/1992 | Culkin |
| 5,094,750 A | 3/1992 | Kopp et al. |
| 5,094,867 A | 3/1992 | Detering et al. |
| 5,098,567 A | 3/1992 | Nishiguchi |
| 5,102,550 A | 4/1992 | Pizzino et al. |
| 5,104,535 A | 4/1992 | Cote et al. |
| 5,104,546 A | 4/1992 | Filson et al. |
| H001045 H | 5/1992 | Wilson |
| 5,135,663 A | 8/1992 | Newberth, III et al. |
| 5,137,631 A | 8/1992 | Eckman et al. |
| 5,137,633 A | 8/1992 | Wang |
| 5,138,870 A | 8/1992 | Lyssy |
| 5,145,826 A | 9/1992 | Hirschberg et al. |
| 5,147,553 A | 9/1992 | Waite |
| 5,151,189 A | 9/1992 | Hu et al. |
| 5,151,191 A | 9/1992 | Sunaoka et al. |
| 5,151,193 A | 9/1992 | Grobe et al. |
| 5,156,738 A | 10/1992 | Maxson |
| 5,158,721 A | 10/1992 | Allegrezza, Jr. et al. |
| 5,169,528 A | 12/1992 | Karbachsch et al. |
| 5,169,530 A | 12/1992 | Schucker et al. |
| 5,180,407 A | 1/1993 | DeMarco |
| 5,182,019 A | 1/1993 | Cote et al. |
| 5,186,821 A | 2/1993 | Murphy |
| 5,192,442 A | 3/1993 | Piccirillo et al. |
| 5,192,456 A | 3/1993 | Ishida et al. |
| 5,192,478 A | 3/1993 | Caskey |
| 5,198,116 A | 3/1993 | Comstock et al. |
| 5,198,162 A | 3/1993 | Park et al. |
| 5,203,405 A | 4/1993 | Gentry et al. |
| 5,209,852 A | 5/1993 | Sunaoka et al. |
| 5,211,728 A | 5/1993 | Trimmer |
| 5,211,823 A | 5/1993 | Giuffrida et al. |
| 5,221,478 A | 6/1993 | Dhingra et al. |
| 5,227,063 A | 7/1993 | Langerak et al. |
| 5,244,579 A | 9/1993 | Horner et al. |
| 5,262,054 A | 11/1993 | Wheeler |
| 5,269,919 A | 12/1993 | von Medlin |
| 5,271,830 A | 12/1993 | Faivre et al. |
| 5,275,766 A | 1/1994 | Gadkaree et al. |
| 5,277,812 A | 1/1994 | Hu et al. |
| 5,282,971 A | 2/1994 | Degen et al. |
| 5,286,324 A | 2/1994 | Kawai et al. |
| 5,288,324 A | 2/1994 | Shaneyfelt |
| 5,290,451 A | 3/1994 | Koster et al. |
| 5,290,457 A | 3/1994 | Karbachsch et al. |
| 5,297,420 A | 3/1994 | Gilliland et al. |
| 5,316,671 A | 5/1994 | Murphy |
| 5,320,760 A | 6/1994 | Freund et al. |
| 5,353,630 A | 10/1994 | Soda et al. |
| 5,354,470 A | 10/1994 | Seita et al. |
| 5,354,587 A | 10/1994 | Abayasekara |
| 5,358,732 A | 10/1994 | Seifter et al. |
| 5,361,625 A | 11/1994 | Ylvisaker |
| 5,364,527 A | 11/1994 | Zimmermann et al. |
| 5,364,529 A | 11/1994 | Morin et al. |
| 5,374,353 A | 12/1994 | Murphy |
| 5,376,274 A | 12/1994 | Muller et al. |
| 5,389,260 A | 2/1995 | Hemp et al. |
| 5,393,433 A | 2/1995 | Espenan et al. |
| 5,396,019 A | 3/1995 | Sartori et al. |
| 5,401,345 A | 3/1995 | Park |
| 5,401,401 A | 3/1995 | Hickok et al. |

(56) References Cited

U.S. PATENT DOCUMENTS

| | | |
|---|---|---|
| 5,401,405 A | 3/1995 | McDougald |
| 5,403,479 A | 4/1995 | Smith et al. |
| 5,403,483 A | 4/1995 | Hayashida et al. |
| 5,411,663 A | 5/1995 | Johnson |
| 5,415,490 A | 5/1995 | Flory |
| 5,417,101 A | 5/1995 | Weich |
| 5,419,816 A | 5/1995 | Sampson et al. |
| 5,425,415 A | 6/1995 | Master et al. |
| 5,451,317 A | 9/1995 | Ishida et al. |
| 5,458,779 A | 10/1995 | Odegaard |
| 5,468,397 A | 11/1995 | Barboza et al. |
| 5,470,469 A | 11/1995 | Eckman |
| 5,477,731 A | 12/1995 | Mouton |
| 5,479,590 A | 12/1995 | Lin |
| 5,482,625 A | 1/1996 | Shimizu et al. |
| 5,484,528 A | 1/1996 | Yagi et al. |
| 5,490,939 A | 2/1996 | Gerigk et al. |
| 5,501,798 A | 3/1996 | Al-Samadi et al. |
| 5,525,220 A | 6/1996 | Yagi et al. |
| 5,531,900 A | 7/1996 | Raghavan et al. |
| 5,543,465 A | 8/1996 | Bell et al. |
| 5,547,575 A | 8/1996 | Demmer et al. |
| 5,552,047 A | 9/1996 | Oshida et al. |
| 5,556,591 A | 9/1996 | Jallerat et al. |
| 5,575,963 A | 11/1996 | Soffer et al. |
| 5,597,732 A | 1/1997 | Bryan-Brown |
| 5,607,593 A | 3/1997 | Cote et al. |
| 5,626,755 A | 5/1997 | Keyser et al. |
| 5,633,163 A | 5/1997 | Cameron |
| 5,639,373 A | 6/1997 | Mahendran et al. |
| 5,647,988 A | 7/1997 | Kawanishi et al. |
| 5,670,053 A | 9/1997 | Collentro et al. |
| 5,677,360 A | 10/1997 | Yamamori et al. |
| 5,688,460 A | 11/1997 | Ruschke |
| 5,690,830 A | 11/1997 | Ohtani et al. |
| 5,725,769 A | 3/1998 | Miller et al. |
| 5,733,456 A | 3/1998 | Okey et al. |
| 5,744,037 A | 4/1998 | Fujimura et al. |
| 5,747,605 A | 5/1998 | Breant et al. |
| 5,766,479 A | 6/1998 | Collentro et al. |
| D396,046 S | 7/1998 | Scheel et al. |
| D396,477 S | 7/1998 | Sadr |
| 5,783,083 A | 7/1998 | Henshaw et al. |
| 5,786,528 A | 7/1998 | Dileo et al. |
| D396,726 S | 8/1998 | Sadr et al. |
| 5,814,234 A | 9/1998 | Bower et al. |
| D400,890 S | 11/1998 | Gambardella |
| 5,843,069 A | 12/1998 | Butler et al. |
| 5,846,424 A | 12/1998 | Khudenko |
| 5,846,425 A | 12/1998 | Whiteman |
| 5,871,823 A | 2/1999 | Anders et al. |
| 5,888,401 A | 3/1999 | Nguyen |
| 5,895,521 A | 4/1999 | Otsuka et al. |
| 5,895,570 A | 4/1999 | Liang |
| 5,906,739 A | 5/1999 | Osterland et al. |
| 5,906,742 A | 5/1999 | Wang et al. |
| 5,918,264 A | 6/1999 | Drummond et al. |
| 5,942,113 A | 8/1999 | Morimura |
| 5,944,997 A | 8/1999 | Pedersen et al. |
| 5,951,878 A | 9/1999 | Astrom |
| 5,958,243 A | 9/1999 | Lawrence et al. |
| 5,961,830 A | 10/1999 | Barnett |
| 5,968,357 A | 10/1999 | Doelle et al. |
| 5,981,614 A | 11/1999 | Adiletta |
| 5,988,400 A | 11/1999 | Karachevtcev et al. |
| 5,989,428 A | 11/1999 | Goronszy |
| 5,997,745 A | 12/1999 | Tonelli et al. |
| 6,001,254 A | 12/1999 | Espenan et al. |
| 6,007,712 A | 12/1999 | Tanaka et al. |
| 6,017,451 A | 1/2000 | Kopf |
| 6,036,030 A | 3/2000 | Stone et al. |
| 6,039,872 A | 3/2000 | Wu |
| 6,045,698 A | 4/2000 | Cote et al. |
| 6,045,899 A | 4/2000 | Wang et al. |
| 6,048,454 A | 4/2000 | Jenkins |
| 6,048,455 A | 4/2000 | Janik |
| 6,056,903 A | 5/2000 | Greenwood et al. |
| 6,066,401 A | 5/2000 | Stilburn |
| 6,071,404 A | 6/2000 | Tsui |
| 6,074,718 A | 6/2000 | Puglia et al. |
| 6,077,435 A | 6/2000 | Beck et al. |
| 6,083,381 A | 7/2000 | Connelly et al. |
| 6,083,393 A | 7/2000 | Wu |
| 6,096,213 A | 8/2000 | Radovanovic et al. |
| 6,113,782 A | 9/2000 | Leonard |
| 6,113,794 A | 9/2000 | Kumar et al. |
| 6,120,688 A | 9/2000 | Daly et al. |
| 6,126,819 A | 10/2000 | Heine et al. |
| 6,149,817 A | 11/2000 | Peterson et al. |
| 6,156,200 A | 12/2000 | Zha et al. |
| 6,159,369 A | 12/2000 | Strohm et al. |
| 6,162,020 A | 12/2000 | Kondo |
| 6,171,496 B1 | 1/2001 | Patil |
| 6,193,890 B1 | 2/2001 | Pedersen et al. |
| 6,214,231 B1 | 4/2001 | Cote et al. |
| 6,214,232 B1 | 4/2001 | Baurmeister et al. |
| 6,217,770 B1 | 4/2001 | Haney et al. |
| 6,221,247 B1 | 4/2001 | Nemser et al. |
| 6,224,767 B1 | 5/2001 | Fujiwara et al. |
| 6,264,839 B1 | 7/2001 | Mohr et al. |
| 6,277,512 B1 | 8/2001 | Hamrock et al. |
| 6,280,626 B1 | 8/2001 | Miyashita et al. |
| 6,284,135 B1 | 9/2001 | Ookata |
| 6,290,756 B1 | 9/2001 | Macheras et al. |
| 6,299,773 B1 | 10/2001 | Takamura et al. |
| 6,303,026 B1 | 10/2001 | Lindbo |
| 6,303,035 B1 | 10/2001 | Cote et al. |
| 6,315,895 B1 | 11/2001 | Summerton et al. |
| 6,319,411 B1 | 11/2001 | Cote |
| 6,322,703 B1 | 11/2001 | Taniguchi et al. |
| 6,325,928 B1 | 12/2001 | Pedersen et al. |
| 6,325,938 B1 | 12/2001 | Miyashita et al. |
| 6,331,248 B1 | 12/2001 | Taniguchi et al. |
| 6,337,018 B1 | 1/2002 | Mickols |
| RE37,549 E | 2/2002 | Mahendran et al. |
| 6,349,835 B1 | 2/2002 | Saux et al. |
| 6,354,444 B1 | 3/2002 | Mahendran et al. |
| 6,361,695 B1 | 3/2002 | Husain et al. |
| 6,368,819 B1 | 4/2002 | Gaddy et al. |
| 6,372,138 B1 | 4/2002 | Cho et al. |
| 6,383,369 B2 | 5/2002 | Elston |
| 6,387,189 B1 | 5/2002 | Groschl et al. |
| 6,402,955 B2 | 6/2002 | Ookata |
| 6,423,214 B1 | 7/2002 | Lindbo |
| 6,423,784 B1 | 7/2002 | Hamrock et al. |
| 6,432,310 B1 | 8/2002 | Andou et al. |
| 6,440,303 B2 | 8/2002 | Spriegel |
| D462,699 S | 9/2002 | Johnson et al. |
| 6,444,124 B1 | 9/2002 | Onyeche et al. |
| 6,448,062 B1 | 9/2002 | Huth et al. |
| 6,465,748 B2 | 10/2002 | Yamanashi et al. |
| 6,468,430 B1 | 10/2002 | Kimura et al. |
| 6,471,869 B1 | 10/2002 | Yanou et al. |
| 6,485,645 B1 | 11/2002 | Husain et al. |
| 6,491,165 B2 | 12/2002 | Kuske et al. |
| 6,495,041 B2 | 12/2002 | Taniguchi et al. |
| 6,517,723 B1 | 2/2003 | Daigger et al. |
| 6,524,733 B1 | 2/2003 | Nonobe |
| 6,550,747 B2 | 4/2003 | Rabie et al. |
| 6,562,237 B1 | 5/2003 | Olaopa |
| 6,565,748 B1 | 5/2003 | Wang et al. |
| 6,576,136 B1 | 6/2003 | De Moel et al. |
| 6,582,603 B1 | 6/2003 | Suzuki et al. |
| 6,592,762 B2 | 7/2003 | Smith |
| 6,596,167 B2 | 7/2003 | Ji et al. |
| D478,913 S | 8/2003 | Johnson et al. |
| 6,602,391 B2 | 8/2003 | Serikov |
| 6,613,222 B2 | 9/2003 | Mikkelson et al. |
| 6,623,643 B2 | 9/2003 | Chisholm et al. |
| 6,627,082 B2 | 9/2003 | Del Vecchio et al. |
| 6,635,104 B2 | 10/2003 | Komkova et al. |
| 6,635,179 B1 | 10/2003 | Summerton et al. |
| 6,641,733 B2 | 11/2003 | Zha et al. |
| 6,645,374 B2 | 11/2003 | Cote et al. |

(56) References Cited

U.S. PATENT DOCUMENTS

| | | |
|---|---|---|
| 6,656,356 B2 | 12/2003 | Gungerich et al. |
| 6,685,832 B2 | 2/2004 | Mahendran et al. |
| 6,696,465 B2 | 2/2004 | Dellaria et al. |
| 6,699,611 B2 | 3/2004 | Kim et al. |
| 6,702,561 B2 | 3/2004 | Stillig et al. |
| 6,705,465 B2 | 3/2004 | Ling et al. |
| 6,706,185 B2 | 3/2004 | Goel et al. |
| 6,706,189 B2 | 3/2004 | Rabie et al. |
| 6,708,957 B2 | 3/2004 | Cote et al. |
| 6,712,970 B1 | 3/2004 | Trivedi |
| 6,721,529 B2 | 4/2004 | Chen et al. |
| 6,723,242 B1 | 4/2004 | Ohkata et al. |
| 6,723,246 B2 | 4/2004 | Krulik |
| 6,723,758 B2 | 4/2004 | Stone et al. |
| 6,727,305 B1 | 4/2004 | Pavez Aranguiz |
| 6,743,362 B1 | 6/2004 | Porteous et al. |
| 6,755,894 B2 | 6/2004 | Bikson et al. |
| 6,755,970 B1 | 6/2004 | Knappe et al. |
| 6,758,972 B2 | 7/2004 | Vriens et al. |
| 6,761,013 B2 | 7/2004 | Tippey et al. |
| 6,761,826 B2 | 7/2004 | Bender |
| 6,770,202 B1 | 8/2004 | Kidd et al. |
| 6,780,466 B2 | 8/2004 | Grangeon et al. |
| 6,783,008 B2 | 8/2004 | Zha et al. |
| 6,790,347 B2 | 9/2004 | Jeong et al. |
| 6,790,912 B2 | 9/2004 | Blong |
| 6,793,820 B1 | 9/2004 | McCray et al. |
| 6,805,806 B2 | 10/2004 | Arnaud |
| 6,808,629 B2 | 10/2004 | Wouters-Wasiak et al. |
| 6,811,696 B2 | 11/2004 | Wang et al. |
| 6,814,861 B2 | 11/2004 | Husain et al. |
| 6,821,420 B2 | 11/2004 | Zha et al. |
| 6,830,782 B2 | 12/2004 | Kanazawa |
| 6,840,251 B2 | 1/2005 | Gill et al. |
| 6,841,070 B2 | 1/2005 | Zha et al. |
| 6,851,259 B2 | 2/2005 | Simburger et al. |
| 6,861,466 B2 | 3/2005 | Dadalas et al. |
| 6,863,816 B2 | 3/2005 | Austin et al. |
| 6,863,817 B2 | 3/2005 | Liu et al. |
| 6,863,818 B2 | 3/2005 | Daigger et al. |
| 6,863,823 B2 | 3/2005 | Cote |
| 6,869,534 B2 | 3/2005 | McDowell et al. |
| 6,881,343 B2 | 4/2005 | Rabie et al. |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,936,085 B2 | 8/2005 | DeMarco |
| 6,946,073 B2 | 9/2005 | Daigger et al. |
| 6,952,258 B2 | 10/2005 | Ebert et al. |
| 6,955,762 B2 | 10/2005 | Gallagher et al. |
| 6,962,258 B2 | 11/2005 | Zha et al. |
| 6,974,554 B2 | 12/2005 | Cox et al. |
| 6,994,867 B1 | 2/2006 | Hossainy et al. |
| 7,000,764 B2 | 2/2006 | Otsubo |
| 7,005,100 B2 | 2/2006 | Lowell |
| 7,014,763 B2 | 3/2006 | Johnson et al. |
| 7,018,530 B2 | 3/2006 | Pollock |
| 7,022,233 B2 | 4/2006 | Chen |
| 7,041,728 B2 | 5/2006 | Zipplies et al. |
| 7,052,610 B2 | 5/2006 | Janson et al. |
| 7,067,058 B2 | 6/2006 | Yeh et al. |
| 7,070,909 B2 | 7/2006 | Japp et al. |
| 7,083,733 B2 | 8/2006 | Freydina et al. |
| 7,087,173 B2 | 8/2006 | Cote et al. |
| 7,122,121 B1 | 10/2006 | Ji |
| 7,147,777 B1 | 12/2006 | Porteous |
| 7,147,778 B1 | 12/2006 | DiMassimo et al. |
| 7,160,455 B2 | 1/2007 | Taniguchi et al. |
| 7,160,463 B2 | 1/2007 | Beck et al. |
| 7,160,464 B2 | 1/2007 | Lee et al. |
| 7,172,699 B1 | 2/2007 | Trivedi et al. |
| 7,172,701 B2 | 2/2007 | Gaid et al. |
| 7,186,344 B2 | 3/2007 | Hughes |
| 7,208,091 B2 | 4/2007 | Pind et al. |
| 7,223,340 B2 | 5/2007 | Zha et al. |
| 7,226,541 B2 | 6/2007 | Muller et al. |
| 7,229,712 B2 | 6/2007 | Eshraghi et al. |
| 7,247,238 B2 | 7/2007 | Mullette et al. |
| 7,255,788 B2 | 8/2007 | Okazaki et al. |
| 7,264,716 B2 | 9/2007 | Johnson et al. |
| 7,279,100 B2 | 10/2007 | Devine |
| 7,279,215 B2 | 10/2007 | Hester et al. |
| 7,314,563 B2 | 1/2008 | Cho et al. |
| 7,329,344 B2 | 2/2008 | Jordan et al. |
| 7,344,645 B2 | 3/2008 | Beck et al. |
| 7,390,418 B2 | 6/2008 | Martin et al. |
| 7,395,646 B2 | 7/2008 | Salman et al. |
| 7,410,584 B2 | 8/2008 | Devine |
| 7,449,112 B2 | 11/2008 | Lee et al. |
| 7,455,765 B2 | 11/2008 | Elefritz et al. |
| 7,459,085 B2 | 12/2008 | Koguma et al. |
| 7,481,933 B2 | 1/2009 | Barnes |
| 7,507,274 B2 | 3/2009 | Tonkovich et al. |
| 7,510,655 B2 | 3/2009 | Barnes |
| 7,537,718 B2 | 5/2009 | Mezhirov et al. |
| 7,563,363 B2 | 7/2009 | Kuzma |
| 7,591,950 B2 | 9/2009 | Zha et al. |
| 7,632,439 B2 | 12/2009 | Mullette et al. |
| 7,648,034 B2 | 1/2010 | Charkoudian et al. |
| 7,648,634 B2 | 1/2010 | Probst |
| 7,662,212 B2 | 2/2010 | Mullette et al. |
| 7,708,887 B2 | 5/2010 | Johnson et al. |
| 7,713,413 B2 | 5/2010 | Barnes |
| 7,718,057 B2 | 5/2010 | Jordan et al. |
| 7,718,065 B2 | 5/2010 | Jordan |
| 7,722,769 B2 | 5/2010 | Jordan et al. |
| 7,761,826 B1 | 7/2010 | Thanvantri et al. |
| 7,819,956 B2 | 10/2010 | Muller |
| 7,850,851 B2 | 12/2010 | Zha et al. |
| 7,867,417 B2 | 1/2011 | Mullette |
| 7,931,463 B2 | 4/2011 | Cox et al. |
| 8,287,923 B2 | 10/2012 | Hsu et al. |
| 8,679,337 B2 | 3/2014 | Ishibashi et al. |
| 2001/0035092 A1 | 11/2001 | Hachimaki et al. |
| 2001/0052494 A1 | 12/2001 | Cote et al. |
| 2002/0027111 A1 | 3/2002 | Ando et al. |
| 2002/0070157 A1 | 6/2002 | Yamada |
| 2002/0104439 A1 | 8/2002 | Komkova et al. |
| 2002/0108906 A1 | 8/2002 | Husain et al. |
| 2002/0117444 A1 | 8/2002 | Mikkelson et al. |
| 2002/0148767 A1 | 10/2002 | Johnson et al. |
| 2002/0153313 A1 | 10/2002 | Cote |
| 2002/0185435 A1 | 12/2002 | Husain et al. |
| 2003/0038080 A1 | 2/2003 | Vriens et al. |
| 2003/0042199 A1 | 3/2003 | Smith |
| 2003/0052055 A1 | 3/2003 | Akamatsu et al. |
| 2003/0056919 A1 | 3/2003 | Beck |
| 2003/0057155 A1 | 3/2003 | Husain et al. |
| 2003/0062301 A1 | 4/2003 | Merrie et al. |
| 2003/0065302 A1 | 4/2003 | Kuroda et al. |
| 2003/0073970 A1 | 4/2003 | Suga |
| 2003/0075495 A1 | 4/2003 | Dannstrom et al. |
| 2003/0075504 A1 | 4/2003 | Zha et al. |
| 2003/0077435 A1 | 4/2003 | Charkoudian et al. |
| 2003/0121855 A1 | 7/2003 | Kopp |
| 2003/0127388 A1 | 7/2003 | Ando et al. |
| 2003/0146153 A1 | 8/2003 | Cote et al. |
| 2003/0159977 A1 | 8/2003 | Tanny et al. |
| 2003/0159988 A1 | 8/2003 | Daigger et al. |
| 2003/0173706 A1 | 9/2003 | Rabie et al. |
| 2003/0196955 A1 | 10/2003 | Hughes |
| 2003/0226797 A1 | 12/2003 | Phelps |
| 2004/0007523 A1 | 1/2004 | Gabon et al. |
| 2004/0007525 A1 | 1/2004 | Rabie et al. |
| 2004/0035770 A1 | 2/2004 | Edwards et al. |
| 2004/0045893 A1 | 3/2004 | Watanabe et al. |
| 2004/0050791 A1 | 3/2004 | Herczeg |
| 2004/0055974 A1 | 3/2004 | Del Vecchio et al. |
| 2004/0092901 A1 | 5/2004 | Reece et al. |
| 2004/0108268 A1 | 6/2004 | Liu et al. |
| 2004/0112831 A1 | 6/2004 | Rabie et al. |
| 2004/0118779 A1 | 6/2004 | Rawson et al. |
| 2004/0129637 A1 | 7/2004 | Husain et al. |

(56) References Cited

U.S. PATENT DOCUMENTS

| | | |
|---|---|---|
| 2004/0149655 A1 | 8/2004 | Petrucco et al. |
| 2004/0154671 A1 | 8/2004 | Martins et al. |
| 2004/0167490 A1 | 8/2004 | Nelson et al. |
| 2004/0167493 A1 | 8/2004 | Jarpenberg et al. |
| 2004/0168947 A1 | 9/2004 | McDonald |
| 2004/0168978 A1 | 9/2004 | Gray |
| 2004/0172002 A1 | 9/2004 | Nelson et al. |
| 2004/0173525 A1 | 9/2004 | Hunniford et al. |
| 2004/0176735 A1 | 9/2004 | Snell |
| 2004/0188341 A1 | 9/2004 | Zha et al. |
| 2004/0195172 A1 | 10/2004 | Yeh et al. |
| 2004/0222158 A1 | 11/2004 | Husain et al. |
| 2004/0232076 A1 | 11/2004 | Zha et al. |
| 2004/0245174 A1 | 12/2004 | Takayama et al. |
| 2005/0000885 A1 | 1/2005 | Stockbower |
| 2005/0006308 A1 | 1/2005 | Cote et al. |
| 2005/0015052 A1 | 1/2005 | Klippen et al. |
| 2005/0023219 A1 | 2/2005 | Kirker et al. |
| 2005/0035065 A1 | 2/2005 | Martin |
| 2005/0045557 A1 | 3/2005 | Daigger et al. |
| 2005/0053878 A1 | 3/2005 | Bruun et al. |
| 2005/0061725 A1 | 3/2005 | Liu et al. |
| 2005/0077227 A1 | 4/2005 | Kirker et al. |
| 2005/0090419 A1 | 4/2005 | Delcomyn et al. |
| 2005/0098494 A1 | 5/2005 | Mullette et al. |
| 2005/0103722 A1 | 5/2005 | Freydina et al. |
| 2005/0109692 A1 | 5/2005 | Zha et al. |
| 2005/0115880 A1 | 6/2005 | Pollock |
| 2005/0115899 A1 | 6/2005 | Liu et al. |
| 2005/0121389 A1 | 6/2005 | Janson et al. |
| 2005/0126963 A1 | 6/2005 | Phagoo et al. |
| 2005/0184008 A1 | 8/2005 | Schacht et al. |
| 2005/0194305 A1 | 9/2005 | Vido et al. |
| 2005/0194310 A1 | 9/2005 | Yamamoto et al. |
| 2005/0194315 A1 | 9/2005 | Adams et al. |
| 2005/0218069 A1 | 10/2005 | Lee et al. |
| 2006/0021929 A1 | 2/2006 | Mannheim et al. |
| 2006/0033222 A1 | 2/2006 | Godfrey et al. |
| 2006/0065596 A1 | 3/2006 | Kent et al. |
| 2006/0081533 A1 | 4/2006 | Khudenko |
| 2006/0151373 A1 | 7/2006 | Szabo et al. |
| 2006/0157404 A1 | 7/2006 | Mullette et al. |
| 2006/0178480 A1 | 8/2006 | Tada et al. |
| 2006/0201879 A1 | 9/2006 | Den Boestert et al. |
| 2006/0228483 A1 | 10/2006 | Abidine |
| 2006/0237038 A1 | 10/2006 | Jetten et al. |
| 2006/0249448 A1 | 11/2006 | Fujishima et al. |
| 2006/0249449 A1 | 11/2006 | Nakhla et al. |
| 2006/0273007 A1 | 12/2006 | Zha et al. |
| 2006/0273038 A1 | 12/2006 | Syed et al. |
| 2007/0007197 A1 | 1/2007 | Mahendran et al. |
| 2007/0039888 A1 | 2/2007 | Ginzburg et al. |
| 2007/0045183 A1 | 3/2007 | Murphy |
| 2007/0051679 A1 | 3/2007 | Adams et al. |
| 2007/0075017 A1 | 4/2007 | Kuzma |
| 2007/0075021 A1 | 4/2007 | Johnson |
| 2007/0084791 A1 | 4/2007 | Jordan et al. |
| 2007/0084795 A1 | 4/2007 | Jordan |
| 2007/0095741 A1 | 5/2007 | Berends |
| 2007/0102339 A1 | 5/2007 | Cote et al. |
| 2007/0107884 A1 | 5/2007 | Sirkar et al. |
| 2007/0108125 A1 | 5/2007 | Cho et al. |
| 2007/0138090 A1 | 6/2007 | Jordan et al. |
| 2007/0170112 A1 | 7/2007 | Elefritz et al. |
| 2007/0181496 A1 | 8/2007 | Zuback |
| 2008/0011675 A1 | 1/2008 | Kedziora |
| 2008/0058440 A1 | 3/2008 | Muller et al. |
| 2008/0093297 A1 | 4/2008 | Gock et al. |
| 2008/0179249 A1 | 7/2008 | Beck et al. |
| 2008/0203017 A1 | 8/2008 | Zha et al. |
| 2008/0203018 A1 | 8/2008 | Muller et al. |
| 2008/0214687 A1 | 9/2008 | Muller et al. |
| 2008/0257822 A1 | 10/2008 | Johnson |
| 2008/0277340 A1 | 11/2008 | Hong et al. |
| 2009/0001018 A1 | 1/2009 | Zha et al. |
| 2009/0008318 A1 | 1/2009 | Anes et al. |
| 2009/0194477 A1 | 8/2009 | Hashimoto |
| 2009/0218274 A1 | 9/2009 | Sakashita et al. |
| 2010/0000942 A1 | 1/2010 | Muller et al. |
| 2010/0012585 A1 | 1/2010 | Zha et al. |
| 2010/0025320 A1 | 2/2010 | Johnson |
| 2010/0051545 A1 | 3/2010 | Johnson et al. |
| 2010/0119815 A1 | 5/2010 | Kim |
| 2010/0170847 A1 | 7/2010 | Zha et al. |
| 2010/0200503 A1 | 8/2010 | Zha et al. |
| 2010/0213117 A1 | 8/2010 | Mullette et al. |
| 2010/0300548 A1 | 12/2010 | DeVerse |
| 2010/0300968 A1 | 12/2010 | Liu et al. |
| 2010/0326906 A1 | 12/2010 | Barnes |
| 2011/0049047 A1 | 3/2011 | Cumin et al. |
| 2011/0049048 A1 | 3/2011 | Benner et al. |
| 2011/0056522 A1 | 3/2011 | Zauner et al. |
| 2011/0127209 A1 | 6/2011 | Rogers et al. |
| 2011/0132826 A1 | 6/2011 | Muller et al. |
| 2011/0139715 A1 | 6/2011 | Zha et al. |
| 2011/0147308 A1 | 6/2011 | Johnston-Hall et al. |
| 2011/0192783 A1 | 8/2011 | Cox et al. |
| 2011/0244215 A1 | 10/2011 | Thom et al. |
| 2012/0074053 A1 | 3/2012 | Collignon et al. |
| 2012/0091602 A1 | 4/2012 | Cumin et al. |
| 2012/0097601 A1 | 4/2012 | Lee et al. |
| 2012/0103904 A1 | 5/2012 | Morita et al. |
| 2012/0285885 A1 | 11/2012 | James et al. |
| 2013/0037467 A1 | 2/2013 | Biltoft et al. |
| 2013/0056426 A1 | 3/2013 | Barnes |
| 2013/0284245 A1 | 10/2013 | Kim et al. |
| 2015/0136686 A1 | 5/2015 | Chen |

FOREIGN PATENT DOCUMENTS

| | | |
|---|---|---|
| AU | 762091 B2 | 6/2003 |
| CA | 897069 A | 4/1972 |
| CA | 2207893 A1 | 12/1997 |
| CA | 2428457 A1 | 5/2002 |
| CA | 2440961 A1 | 9/2002 |
| CA | 2531764 A1 | 3/2005 |
| CN | 2204898 Y | 8/1995 |
| CN | 2236049 Y | 9/1996 |
| CN | 1159770 A | 9/1997 |
| CN | 1541757 A | 11/2004 |
| CN | 1552507 A | 12/2004 |
| DE | 4007383 A1 | 9/1991 |
| DE | 4117281 A1 | 1/1992 |
| DE | 4113420 A1 | 10/1992 |
| DE | 4117422 C1 | 11/1992 |
| DE | 4326603 A1 | 2/1995 |
| DE | 19503060 A1 | 8/1996 |
| DE | 19718028 C1 | 6/1998 |
| DE | 29804927 U1 | 6/1998 |
| DE | 29906389 U1 | 6/1999 |
| DE | 10209170 C1 | 8/2003 |
| DE | 202004012693 U1 | 10/2004 |
| EP | 0012557 A1 | 6/1980 |
| EP | 0038612 B1 | 10/1981 |
| EP | 0053833 A2 | 6/1982 |
| EP | 0090383 A2 | 10/1983 |
| EP | 126714 A2 | 11/1984 |
| EP | 261734 A1 | 3/1988 |
| EP | 0341151 A2 | 11/1989 |
| EP | 090383 B1 | 5/1990 |
| EP | 0385747 A2 | 9/1990 |
| EP | 419396 A1 | 3/1991 |
| EP | 229019 B1 | 9/1991 |
| EP | 463627 A2 | 1/1992 |
| EP | 0464321 A1 | 1/1992 |
| EP | 0474512 A2 | 3/1992 |
| EP | 492942 A2 | 7/1992 |
| EP | 509663 B2 | 10/1992 |
| EP | 518250 B1 | 12/1992 |
| EP | 547575 A1 | 6/1993 |
| EP | 550798 A1 | 7/1993 |
| EP | 280052 A1 | 7/1994 |
| EP | 492446 B1 | 11/1995 |
| EP | 430082 B1 | 6/1996 |

(56) References Cited

FOREIGN PATENT DOCUMENTS

| | | |
|---|---|---|
| EP | 581168 B1 | 10/1996 |
| EP | 734758 A1 | 10/1996 |
| EP | 763758 A1 | 3/1997 |
| EP | 0772488 A1 | 5/1997 |
| EP | 824956 A2 | 2/1998 |
| EP | 848194 A2 | 6/1998 |
| EP | 0937494 A2 | 8/1999 |
| EP | 1034835 A1 | 9/2000 |
| EP | 1156015 A1 | 11/2001 |
| EP | 1236503 A1 | 8/2004 |
| EP | 1236503 B1 | 8/2004 |
| EP | 1466658 A1 | 10/2004 |
| FR | 2620712 A1 | 3/1989 |
| FR | 2674448 A1 | 10/1992 |
| FR | 2699424 A1 | 6/1994 |
| FR | 2762834 A1 | 11/1998 |
| FR | 2850297 A1 | 7/2004 |
| GB | 702911 A | 1/1954 |
| GB | 996195 A | 6/1965 |
| GB | 1238004 A | 7/1971 |
| GB | 2253572 A | 9/1992 |
| GB | 2390042 A | 12/2003 |
| JP | 52-078677 A | 7/1977 |
| JP | 53-5077 | 1/1978 |
| JP | 53-028083 | 3/1978 |
| JP | 53108882 A | 9/1978 |
| JP | 54162684 A | 12/1979 |
| JP | 55099703 A | 7/1980 |
| JP | 55129107 A | 10/1980 |
| JP | 55129155 A | 10/1980 |
| JP | 56021604 A | 2/1981 |
| JP | 56118701 A | 9/1981 |
| JP | 56121685 A | 9/1981 |
| JP | 57190697 A | 11/1982 |
| JP | 58088007 A | 5/1983 |
| JP | 60019002 A | 1/1985 |
| JP | 60206412 A | 10/1985 |
| JP | 60260628 A | 12/1985 |
| JP | 61097005 A | 5/1986 |
| JP | 61097006 A | 5/1986 |
| JP | 61107905 A | 5/1986 |
| JP | 61167406 A | 7/1986 |
| JP | 61167407 A | 7/1986 |
| JP | 61171504 A | 8/1986 |
| JP | 61192309 A | 8/1986 |
| JP | 61222510 A | 10/1986 |
| JP | 61242607 A | 10/1986 |
| JP | 61249505 A | 11/1986 |
| JP | 61257203 A | 11/1986 |
| JP | 61263605 A | 11/1986 |
| JP | 61291007 A | 12/1986 |
| JP | 61293504 A | 12/1986 |
| JP | 62004408 A | 1/1987 |
| JP | 62068828 A | 3/1987 |
| JP | 62114609 A | 5/1987 |
| JP | 62140607 A | 6/1987 |
| JP | 62144708 A | 6/1987 |
| JP | 62163708 A | 7/1987 |
| JP | 62179540 A | 8/1987 |
| JP | 62237908 A | 10/1987 |
| JP | 62250908 A | 10/1987 |
| JP | 62187606 | 11/1987 |
| JP | 62262710 A | 11/1987 |
| JP | 63-93307 | 4/1988 |
| JP | 63097634 A | 4/1988 |
| JP | 63099246 A | 4/1988 |
| JP | 63143905 A | 6/1988 |
| JP | 63-1602 | 7/1988 |
| JP | 63171607 A | 7/1988 |
| JP | 63180254 A | 7/1988 |
| JP | S63-38884 | 10/1988 |
| JP | 64-075542 A | 3/1989 |
| JP | 1111494 A | 4/1989 |
| JP | 01151906 A | 6/1989 |
| JP | 01-307409 A | 12/1989 |
| JP | 02-017925 | 1/1990 |
| JP | 2009498 A | 1/1990 |
| JP | 02017924 | 1/1990 |
| JP | 02026625 A | 1/1990 |
| JP | 02031200 A | 2/1990 |
| JP | 02040296 A | 2/1990 |
| JP | 02-086822 A | 3/1990 |
| JP | 02107318 A | 4/1990 |
| JP | 02126922 A | 5/1990 |
| JP | 02144132 A | 6/1990 |
| JP | 02164423 A | 6/1990 |
| JP | 02174918 A | 7/1990 |
| JP | 02241523 A | 9/1990 |
| JP | 02277528 A | 11/1990 |
| JP | 02284035 A | 11/1990 |
| JP | 02302449 A | 12/1990 |
| JP | 03018373 A | 1/1991 |
| JP | 03028797 A | 2/1991 |
| JP | 03-086529 A | 4/1991 |
| JP | 03110445 A | 5/1991 |
| JP | 03-137927 A | 6/1991 |
| JP | 03186325 A | 8/1991 |
| JP | 04022428 | 1/1992 |
| JP | 04108518 A | 4/1992 |
| JP | 04110023 A | 4/1992 |
| JP | 4-190889 A | 7/1992 |
| JP | 04187224 A | 7/1992 |
| JP | 4-256425 A | 9/1992 |
| JP | 04250898 A | 9/1992 |
| JP | 04256424 A | 9/1992 |
| JP | 04265128 A | 9/1992 |
| JP | 04293527 A | 10/1992 |
| JP | 04293528 A | 10/1992 |
| JP | 04300636 A | 10/1992 |
| JP | 04310223 A | 11/1992 |
| JP | 04317793 A | 11/1992 |
| JP | 04334530 A | 11/1992 |
| JP | 04348252 A | 12/1992 |
| JP | 05-4030 | 1/1993 |
| JP | 05023557 A | 2/1993 |
| JP | 05-96140 | 4/1993 |
| JP | 05096136 A | 4/1993 |
| JP | H0580522 A | 4/1993 |
| JP | 05115760 A | 5/1993 |
| JP | 05131124 A | 5/1993 |
| JP | 05137977 A | 6/1993 |
| JP | 05157654 A | 6/1993 |
| JP | 05161831 A | 6/1993 |
| JP | 05184884 A | 7/1993 |
| JP | 05285348 A | 11/1993 |
| JP | 05305221 A | 11/1993 |
| JP | 06-027215 A | 2/1994 |
| JP | 06-087935 A | 3/1994 |
| JP | 06071120 A | 3/1994 |
| JP | 06114240 A | 4/1994 |
| JP | 06170364 A | 6/1994 |
| JP | 06190250 A | 7/1994 |
| JP | 06218237 A | 8/1994 |
| JP | 06238273 A | 8/1994 |
| JP | 06-292820 A | 10/1994 |
| JP | 06277469 A | 10/1994 |
| JP | 06285496 A | 10/1994 |
| JP | 06343837 A | 12/1994 |
| JP | 07000770 A | 1/1995 |
| JP | 07003043 A | 1/1995 |
| JP | 07024272 A | 1/1995 |
| JP | 07068139 A | 3/1995 |
| JP | 07136470 A | 5/1995 |
| JP | 07136471 A | 5/1995 |
| JP | 07155564 A | 6/1995 |
| JP | 07155570 A | 6/1995 |
| JP | 07155758 A | 6/1995 |
| JP | 7-39921 | 7/1995 |
| JP | 07178323 A | 7/1995 |
| JP | 07185268 A | 7/1995 |
| JP | 07185270 A | 7/1995 |
| JP | 07185271 A | 7/1995 |
| JP | 07185272 A | 7/1995 |
| JP | 07204635 A | 8/1995 |

(56) References Cited

FOREIGN PATENT DOCUMENTS

| | | |
|---|---|---|
| JP | 07236819 A | 9/1995 |
| JP | 07251043 A | 10/1995 |
| JP | 07256253 | 10/1995 |
| JP | 07275665 A | 10/1995 |
| JP | 07289860 A | 11/1995 |
| JP | 07303895 A | 11/1995 |
| JP | 07313973 A | 12/1995 |
| JP | 08010585 A | 1/1996 |
| JP | 8039089 | 2/1996 |
| JP | 08052331 A | 2/1996 |
| JP | 08197053 A | 8/1996 |
| JP | 08323161 A | 12/1996 |
| JP | 08332357 A | 12/1996 |
| JP | 09000890 A | 1/1997 |
| JP | 09038470 A | 2/1997 |
| JP | 09038648 A | 2/1997 |
| JP | 09072993 A | 3/1997 |
| JP | 09075689 A | 3/1997 |
| JP | 09099227 A | 4/1997 |
| JP | 09103655 A | 4/1997 |
| JP | 09103661 A | 4/1997 |
| JP | 9117647 | 5/1997 |
| JP | 9138298 | 5/1997 |
| JP | 09141063 A | 6/1997 |
| JP | 09155345 A | 6/1997 |
| JP | 09187628 A | 7/1997 |
| JP | 09192458 A | 7/1997 |
| JP | 09220569 A | 8/1997 |
| JP | 09271641 A | 10/1997 |
| JP | 09313902 A | 12/1997 |
| JP | 09324067 A | 12/1997 |
| JP | 10015365 A | 1/1998 |
| JP | 10024222 A | 1/1998 |
| JP | 10033955 A | 2/1998 |
| JP | 10048466 A | 2/1998 |
| JP | 10-060142 | 3/1998 |
| JP | 10066972 A | 3/1998 |
| JP | 10076144 A | 3/1998 |
| JP | 10076264 A | 3/1998 |
| JP | 10085562 A | 4/1998 |
| JP | 10085565 A | 4/1998 |
| JP | 10085566 A | 4/1998 |
| JP | 10156149 A | 6/1998 |
| JP | 10180048 A | 7/1998 |
| JP | 10225685 A | 8/1998 |
| JP | 10235168 A | 9/1998 |
| JP | 10249171 A | 9/1998 |
| JP | 10286441 A | 10/1998 |
| JP | 10328538 A | 12/1998 |
| JP | 11005023 A | 1/1999 |
| JP | 11028339 A | 2/1999 |
| JP | 11028467 A | 2/1999 |
| JP | 11031025 A | 2/1999 |
| JP | 11033365 A | 2/1999 |
| JP | 11033367 A | 2/1999 |
| JP | 11076769 A | 3/1999 |
| JP | 11076770 A | 3/1999 |
| JP | 11090189 A | 4/1999 |
| JP | 11152366 A | 6/1999 |
| JP | 11156166 A | 6/1999 |
| JP | 11156360 A | 6/1999 |
| JP | 11165200 A | 6/1999 |
| JP | 11179171 A | 7/1999 |
| JP | 11300177 A | 11/1999 |
| JP | 11302438 A | 11/1999 |
| JP | 11309351 A | 11/1999 |
| JP | 11319501 A | 11/1999 |
| JP | 11319501 A | 11/1999 |
| JP | 11333265 A | 12/1999 |
| JP | 2000000439 A | 1/2000 |
| JP | 200051670 | 2/2000 |
| JP | 2000051669 A | 2/2000 |
| JP | 2000061466 A | 2/2000 |
| JP | 20079390 A | 3/2000 |
| JP | 2000070684 A | 3/2000 |
| JP | 2000093758 | 4/2000 |
| JP | 2000157845 | 6/2000 |
| JP | 2000157850 A | 6/2000 |
| JP | 2000185220 A | 7/2000 |
| JP | 2000189958 A | 7/2000 |
| JP | 2000233020 A | 8/2000 |
| JP | 2000237548 A | 9/2000 |
| JP | 2000300968 A | 10/2000 |
| JP | 2000317276 A | 11/2000 |
| JP | 2000334276 A | 12/2000 |
| JP | 2000342932 A | 12/2000 |
| JP | 2001009246 A | 1/2001 |
| JP | 2001070967 A | 3/2001 |
| JP | 2001079366 A | 3/2001 |
| JP | 2001079367 A | 3/2001 |
| JP | 2001104760 A | 4/2001 |
| JP | 2001120963 A | 5/2001 |
| JP | 2001179059 A | 7/2001 |
| JP | 2001179060 A | 7/2001 |
| JP | 2001190937 A | 7/2001 |
| JP | 2001190938 A | 7/2001 |
| JP | 2001205055 A | 7/2001 |
| JP | 2001212587 A | 8/2001 |
| JP | 2001232160 A | 8/2001 |
| JP | 2001-269546 | 10/2001 |
| JP | 2002011472 A | 1/2002 |
| JP | 2002143849 A | 5/2002 |
| JP | 2002177746 A | 6/2002 |
| JP | 2002263407 A | 9/2002 |
| JP | 2002-336663 | 11/2002 |
| JP | 2003024751 | 1/2003 |
| JP | 2003047830 A | 2/2003 |
| JP | 2003053157 A | 2/2003 |
| JP | 2003053160 A | 2/2003 |
| JP | 200371254 A | 3/2003 |
| JP | 2003062436 A | 3/2003 |
| JP | 2003135935 A | 5/2003 |
| JP | 2003190976 A | 7/2003 |
| JP | 2003-265597 | 9/2003 |
| JP | 2003-275548 | 9/2003 |
| JP | 2003266072 A | 9/2003 |
| JP | 2003275759 A | 9/2003 |
| JP | 2003340250 A | 12/2003 |
| JP | 2004008981 | 1/2004 |
| JP | 2004050011 A | 2/2004 |
| JP | 2004073950 A | 3/2004 |
| JP | 2004-230287 A | 8/2004 |
| JP | 2004216263 A | 8/2004 |
| JP | 2004230280 A | 8/2004 |
| JP | 2004523338 T | 8/2004 |
| JP | 2004249168 A | 9/2004 |
| JP | 2004322100 A | 11/2004 |
| JP | 2004337730 A | 12/2004 |
| JP | 2005-087887 A | 4/2005 |
| JP | 2005-514517 T | 5/2005 |
| JP | 2005144291 A | 6/2005 |
| JP | 2005154551 A | 6/2005 |
| JP | 2005-528213 A | 9/2005 |
| JP | 2005279447 A | 10/2005 |
| JP | 2006116495 | 5/2006 |
| JP | 2007203254 A | 8/2007 |
| KR | 20-0232145 | 7/2001 |
| KR | 2002061017 | 7/2002 |
| KR | 1020020067227 | 8/2002 |
| KR | 20-0295350 | 11/2002 |
| KR | 2002-0090967 | 12/2002 |
| KR | 2003-033812 | 5/2003 |
| KR | 2003-060625 | 7/2003 |
| KR | 20030066271 | 8/2003 |
| KR | 20030097167 | 12/2003 |
| KR | 2005-063478 | 6/2005 |
| NL | 1006390 C2 | 12/1998 |
| NL | 1020491 C | 10/2003 |
| NL | 1021197 C | 10/2003 |
| TW | 216773 B | 12/1993 |
| TW | 347343 | 12/1998 |
| WO | 1985001449 A1 | 4/1985 |
| WO | 1986005116 A1 | 9/1986 |
| WO | 1986005705 A1 | 10/1986 |

(56) References Cited

FOREIGN PATENT DOCUMENTS

| | | |
|---|---|---|
| WO | 8800494 A1 | 1/1988 |
| WO | 8801529 A1 | 3/1988 |
| WO | 88001895 A1 | 3/1988 |
| WO | 8806200 A1 | 8/1988 |
| WO | 8900880 A1 | 2/1989 |
| WO | 9000434 A1 | 1/1990 |
| WO | 9104783 A1 | 4/1991 |
| WO | 9116124 A1 | 10/1991 |
| WO | 9117204 A1 | 11/1991 |
| WO | 9302779 A1 | 2/1993 |
| WO | 1993002779 A1 | 2/1993 |
| WO | 9315827 A1 | 8/1993 |
| WO | 9323152 A1 | 11/1993 |
| WO | 9411094 A1 | 5/1994 |
| WO | 9511736 A1 | 5/1995 |
| WO | 9534424 A1 | 12/1995 |
| WO | 9603202 A1 | 2/1996 |
| WO | 9607470 A1 | 3/1996 |
| WO | 1996014913 A1 | 5/1996 |
| WO | 9628236 A1 | 9/1996 |
| WO | 199629142 A1 | 9/1996 |
| WO | 9641676 A1 | 12/1996 |
| WO | 9706880 A2 | 2/1997 |
| WO | 9710046 A1 | 3/1997 |
| WO | 9822204 A1 | 5/1998 |
| WO | 9825694 A1 | 6/1998 |
| WO | 9828066 A1 | 7/1998 |
| WO | 9853902 A1 | 12/1998 |
| WO | 9901207 A1 | 1/1999 |
| WO | 9906326 A1 | 2/1999 |
| WO | 199908773 A1 | 2/1999 |
| WO | 99-55448 A1 | 11/1999 |
| WO | 9959707 A1 | 11/1999 |
| WO | 0021890 A1 | 4/2000 |
| WO | 200018498 A1 | 4/2000 |
| WO | 0030740 A1 | 6/2000 |
| WO | 200030742 A1 | 6/2000 |
| WO | 2000043115 A1 | 7/2000 |
| WO | 200100307 A2 | 1/2001 |
| WO | 200105715 A1 | 1/2001 |
| WO | 0108790 A1 | 2/2001 |
| WO | 200119414 A1 | 3/2001 |
| WO | 200132299 A1 | 5/2001 |
| WO | 200136075 A1 | 5/2001 |
| WO | 0143856 A1 | 6/2001 |
| WO | 200145829 A1 | 6/2001 |
| WO | 2002004100 | 1/2002 |
| WO | 0211867 A1 | 2/2002 |
| WO | 0230550 A1 | 4/2002 |
| WO | 200226363 A2 | 4/2002 |
| WO | 0238256 A1 | 5/2002 |
| WO | 2002038256 A1 | 5/2002 |
| WO | 2002040140 A1 | 5/2002 |
| WO | 2002047800 A1 | 6/2002 |
| WO | 2002087734 A1 | 11/2002 |
| WO | 2003000389 A2 | 1/2003 |
| WO | 03013706 A1 | 2/2003 |
| WO | 2003024575 A1 | 3/2003 |
| WO | 03053552 A1 | 7/2003 |
| WO | 03057632 A1 | 7/2003 |
| WO | 03059495 A1 | 7/2003 |
| WO | 03068374 A1 | 8/2003 |
| WO | 2003068374 A1 | 8/2003 |
| WO | 2003080228 A1 | 10/2003 |
| WO | 2003095078 A1 | 11/2003 |
| WO | 04024304 A2 | 3/2004 |
| WO | 2004018084 A1 | 3/2004 |
| WO | 2004033078 A1 | 4/2004 |
| WO | 2004050221 A1 | 6/2004 |
| WO | 2004056458 A3 | 7/2004 |
| WO | 2004078327 A1 | 9/2004 |
| WO | 2004094049 A1 | 11/2004 |
| WO | 2004101120 A1 | 11/2004 |
| WO | 2005002712 A1 | 1/2005 |
| WO | 2005005028 A1 | 1/2005 |
| WO | 2005021140 A1 | 3/2005 |
| WO | 2005023997 A1 | 3/2005 |
| WO | 2005028085 A1 | 3/2005 |
| WO | 2005028086 A1 | 3/2005 |
| WO | 2005030916 A2 | 4/2005 |
| WO | 2005037414 A1 | 4/2005 |
| WO | 2005046849 A1 | 5/2005 |
| WO | 2005070524 A1 | 8/2005 |
| WO | 2005077499 A1 | 8/2005 |
| WO | 2005082498 A1 | 9/2005 |
| WO | 2005107929 A2 | 11/2005 |
| WO | 2006002479 A1 | 1/2006 |
| WO | 2006017911 A1 | 2/2006 |
| WO | 2006026814 A1 | 3/2006 |
| WO | 2006029456 A1 | 3/2006 |
| WO | 2006029465 | 3/2006 |
| WO | 2006047814 A1 | 5/2006 |
| WO | 2006058384 A1 | 6/2006 |
| WO | 2006066319 A1 | 6/2006 |
| WO | 2006066350 A1 | 6/2006 |
| WO | 2006126833 A1 | 11/2006 |
| WO | 2007006104 A1 | 1/2007 |
| WO | 2007022576 A1 | 3/2007 |
| WO | 2007035987 A1 | 4/2007 |
| WO | 2007053528 A2 | 5/2007 |
| WO | 2007065956 A1 | 6/2007 |
| WO | 2007073080 A1 | 6/2007 |
| WO | 2007135087 A1 | 11/2007 |
| WO | 2008025077 A1 | 3/2008 |
| WO | 2008034570 A1 | 3/2008 |
| WO | 2008071516 A1 | 6/2008 |
| WO | 2008141080 A1 | 11/2008 |
| WO | 2008153818 A1 | 12/2008 |
| WO | 2009030405 A1 | 3/2009 |
| WO | 2012040412 A1 | 3/2012 |
| WO | 2012091309 A2 | 7/2012 |
| WO | 2013048801 A1 | 4/2013 |
| WO | 2013049109 A1 | 4/2013 |

OTHER PUBLICATIONS

Cui et al., "Airlift crossflow membrane filtration—a feasibility study with dextran ultrafiltration," J. Membrane Sci. (1997) vol. 128, pp. 83-91.

Coulson et al., "Coulson and Richardson's Chemical Engineering," 1999, vol. 1, pp. 358-364.

Schematic of 4" Geyser Pump, Geyser Pump Tech. Co., Nov. 13, 2005.

Miller et al., "Side Stream Air Lift MBR Development and Successful Application of a New Generation of MBR," Pollution Solutions Brochure, NORIT, The Netherlands, Apr. 2008.

Judd, "The MBR Book: Principles and Applications of Membrane Bioreactors in Water and Wastewater Treatment," (2006), pp. 174-178.

EPA, Membrane Filtration Guidance Manual, Nov. 2005.

Berg et al., "Flux Decline in Ultrafiltration Processes," Desalination, 77 (1990) pp. 101-133.

AERATION DEVICE FOR FILTRATION SYSTEM

TECHNICAL FIELD

Aspects and embodiments disclosed herein relate to membrane filtration systems, and more particularly to those systems employing porous or permeable membranes located in a pressurised shell or a tank or cell open to atmosphere and an aeration device for use with such membrane filtration systems.

BACKGROUND

Any discussion of the prior art throughout the specification should in no way be considered as an admission that such prior art is widely known or forms part of common general knowledge in the field.

Membrane filtration systems typically can be operated in a single or double-ended manner. That is, filtrate can be withdrawn from one or both ends of the membranes, particularly when the membranes are in the form of tubes or fibres. Double-ended systems are typically more efficient in that more permeate can be withdrawn from the membranes within a set period due to reduced pressure drop along the length of the membrane.

Similarly, the efficiency of the membrane filtration systems is typically dependent on the surface area of the membrane exposed to liquid to be filtered. In the case of filtration systems using bundles of membranes tubes or fibres, the surface area of the system may be increased by a number of methods including increasing the packing density of the tubes or fibres and/or by increasing the length of the tubes or fibres extending between their end supports.

The success of a membrane filtration process largely depends on employing an effective and efficient membrane cleaning method. Porous membrane filtration systems require regular backwashing of the membranes to maintain filtration efficiency and flux while reducing transmembrane pressure (TMP) which rises as the membrane pores become clogged with impurities. Typically, during the backwash cycle the impurities are forced out of the membrane pores and/or scoured from the membrane surfaces into the feed tank or cell by one or more of pressurised gas, gas bubbles, liquid, or a mixture thereof. The liquid containing impurities and deposits from the membranes is then drained or flushed from the tank.

Minimising the footprint of filtration systems is desirable in terms of space eventually occupied by the filtration plant. Compact systems have lower cost, less waste volume, lesser impact on the environment and are more acceptable to the market.

SUMMARY

Aspects and embodiments disclosed herein seek to overcome one or more of the above mentioned problems of the prior art, provide one or more of the advantages outlined above or at least provide a useful alternative.

According to one embodiment, there is provided an aeration device configured to be fitted to a membrane filtration module having membranes mounted therein. The aeration device comprises a sleeve configured to at least partially surround the membrane filtration module, the sleeve having one end adapted to engage with the membrane filtration module and another end adapted to engage with a filtrate collection conduit or manifold. The sleeve comprises an outer wall and an inner wall spaced therefrom. The inner wall and the outer wall downwardly extend co-axially from a joining portion. The outer wall and the inner wall define a chamber therebetween having an open lower end at a distal end of the inner wall and a closed upper end at the joining portion where the inner wall and the outer wall of the sleeve are joined. A gas inlet is configured to communicate gas from a source of gas to the chamber. One or more aeration openings are defined in the inner wall of the sleeve and are configured to provide fluid communication between the chamber and the membranes of the membrane filtration module. One or more drain openings are defined in the outer wall of the sleeve and are configured to provide fluid communication between the membranes of the membrane filtration module and an outside of the sleeve.

In some embodiments, the aeration device is engaged to the filtrate collection conduit or manifold by a threading engagement between complimentary screw threads provided on the respective filtrate collection conduit or manifold and the one end of the outer wall of the sleeve.

In some embodiments, the inner wall extends downwardly part way along a length of the outer wall of the sleeve.

In some embodiments, a first set of portions of the inner wall extend downwardly along the length of the outer wall of the sleeve to a greater extent than a second set of portions of the inner wall extend downwardly along the length of the outer wall of the sleeve.

In some embodiments, the first set of portions of the inner wall extend downwardly along the length of the outer wall and terminate below an upper extent of the one or more drain openings.

In some embodiments, the second set of portions of the inner wall extend downwardly along the length of the outer wall and terminate above the upper extent of the one or more drain openings.

In some embodiments, a plurality of aeration openings are provided in the inner wall of the sleeve, the aeration openings being circumferentially spaced from one another around the periphery of the inner wall of the sleeve.

In some embodiments, a first set of the plurality of aeration openings have lower ends disposed below an upper extent of the one or more drain openings.

In some embodiments, a second set of the plurality of aeration openings have lower ends disposed above an upper extent of the one or more drain openings.

In some embodiments, the plurality of aeration openings are formed as vertically extending slots.

In some embodiments, the slots are open at their lower ends and taper inwardly towards upper closed ends of the slots.

In some embodiments, the taper is stepped with an initial taper along part of a lower portion of the slot then an inward step of reduced width and a further taper from the step to the upper end of the slot.

In some embodiments, the gas inlet is provided at the joining portion of the sleeve.

In some embodiments, the one or more drain openings include a plurality of circumferentially spaced drain openings defined in the outer wall of the sleeve.

According to another embodiment, there is provided a membrane filtration system having a plurality of vertically extending membrane filtration modules mounted in a rack, each membrane filtration module including membranes in fluid communication with upper and lower filtrate collection manifolds, wherein each membrane module is provided with an aeration device as described above and the aeration device is engaged with the lower filtration collection manifold.

BRIEF DESCRIPTION OF DRAWINGS

Aspects and embodiments will now be described, by way of example only, with reference to the accompanying drawings. The accompanying drawings are not intended to be drawn to scale. In the drawings, each identical or nearly identical component that is illustrated in various figures is represented by a like numeral. For purposes of clarity, not every component may be labelled in every drawing. In the drawings.

DETAILED DESCRIPTION

Figure 1:
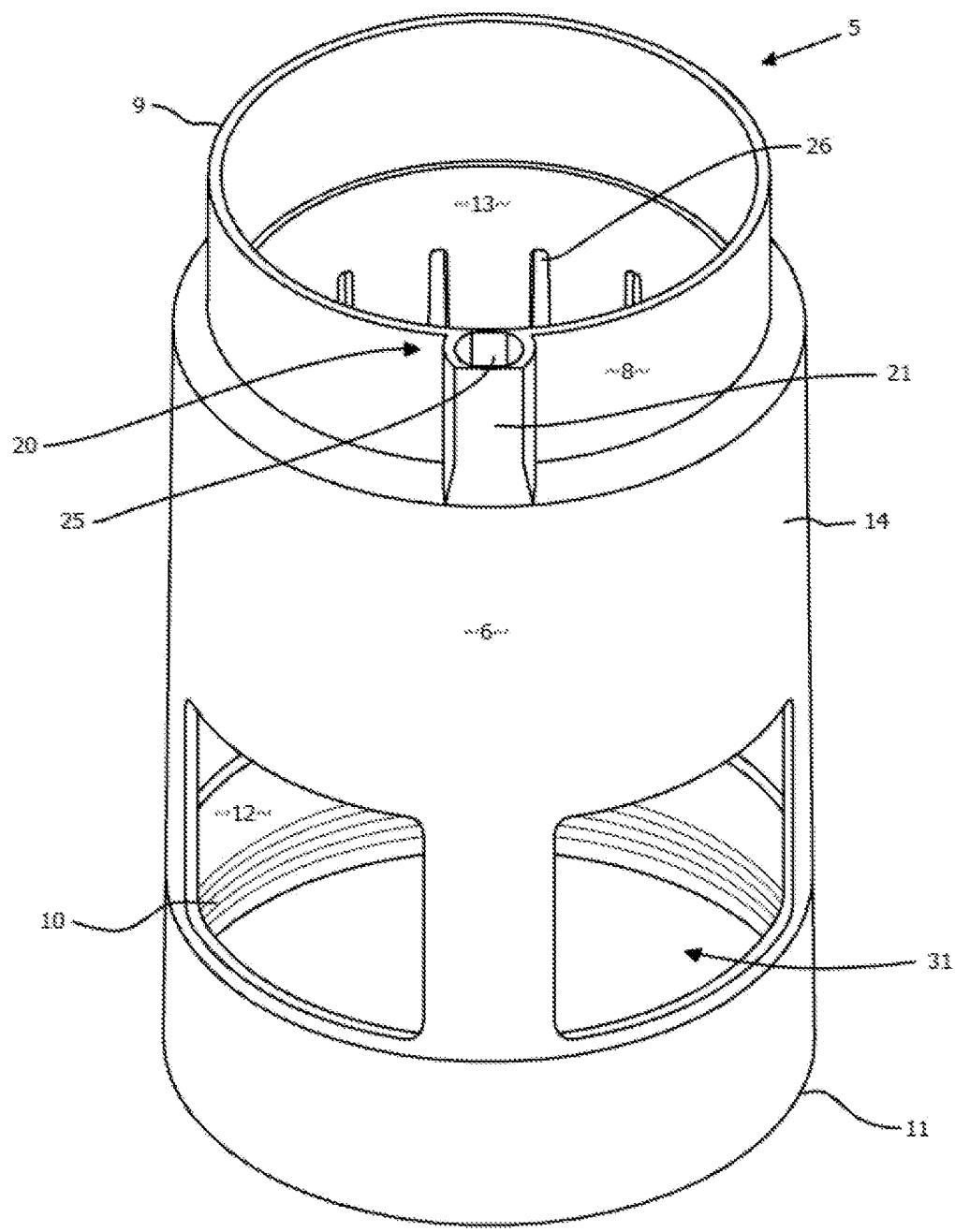
FIG. 1 is a top perspective view of the aeration device according to one embodiment.

Aspects and embodiments disclosed herein are not limited to the details of construction and the arrangement of components set forth in the following description or illustrated in the drawings. Aspects and embodiments disclosed herein are capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

In filtration systems employing gas bubble scouring of the membranes it has been found advantageous to confine the bubbles as much as possible in the region of the membranes to assist with the scouring process.

Referring to the Figures, FIG. 1 shows one embodiment of an aeration device 5 according to one aspect. In this embodiment, the aeration device 5 is in the form of a generally cylindrical sleeve 6, however, it will be appreciated the shape of the sleeve is not narrowly critical and sleeves having any suitable cross-sectional configuration may be used. For example, sleeves with elliptical, square, rectangular, hexagonal, or any multi-sided cross-section could be used given one function of the sleeve is to retain aerating bubbles within a membrane filtration module 7. Further, it is not essential that the sleeve be solid or completely surrounds the circumference of the membrane filtration module 7.

The sleeve 6 has a stepped reduced-diameter portion 8 at an upper end 9 and attachment means in the form an internal threaded portion 10 at its lower end 11. The internal threaded portion 10 is formed on an inner side 12 of the lower end 11 of the sleeve 6. The form of attachment is again not narrowly critical and any suitable form of attachment may be used, for example, a circlip arrangement or a bayonet-type fitting.

Figure 2:
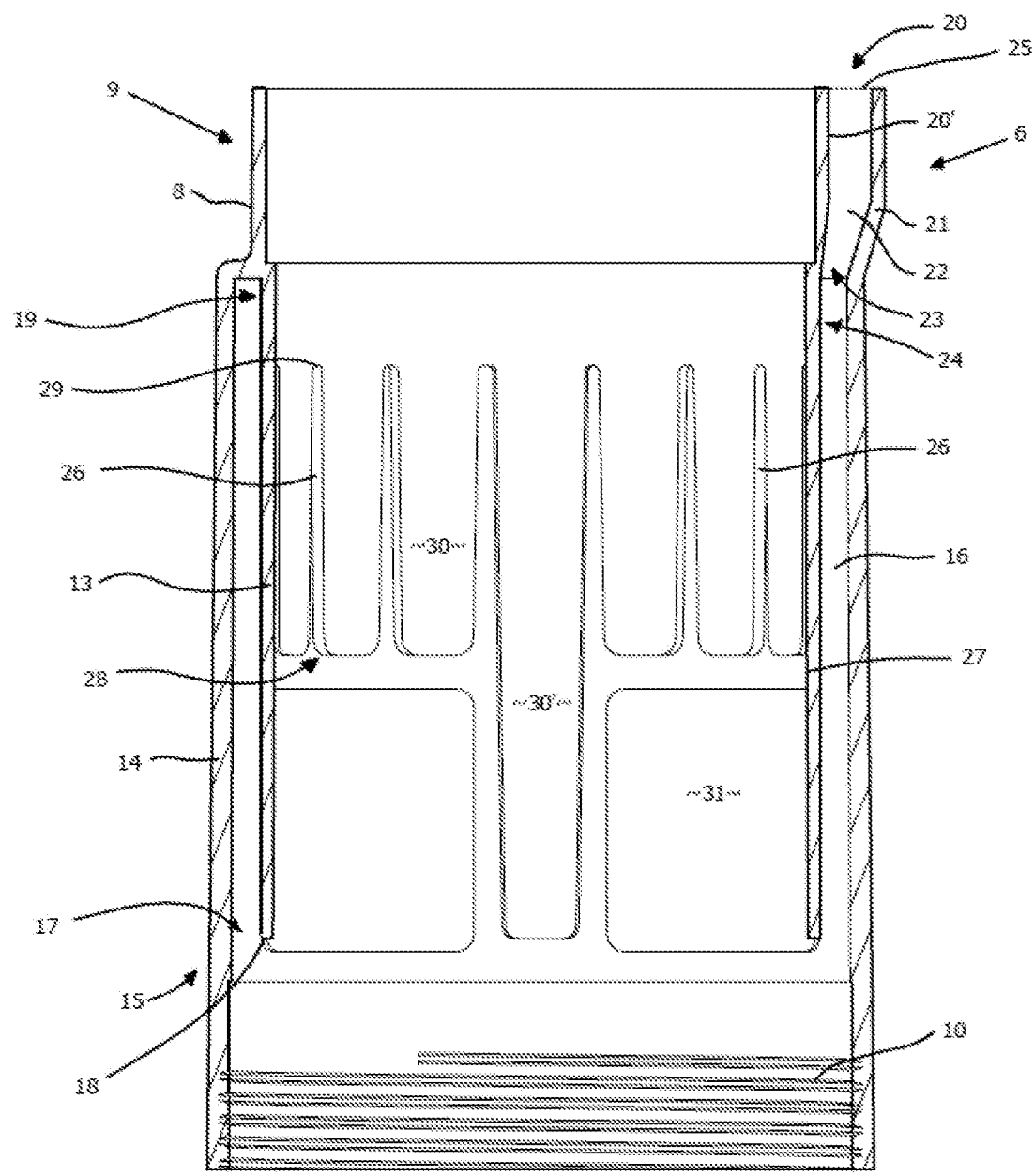
FIG. 2 is a sectional side elevation view of the aeration device of FIG. 1.

As best shown in FIG. 2, the sleeve 6 below the stepped reduced-diameter portion 8 has an inner wall 13 radially spaced from and extending co-axially with an outer wall 14 of the sleeve. The inner wall 13 extends at least part way along the axial length of the lower portion 15 of the outer wall 14 of the sleeve 6. The inner wall 13 and the outer wall 14 define a chamber 16 therebetween having an open lower end 17 at a distal end 18 of the inner wall 13 and a closed upper end 19 where the inner wall 13 and the outer wall 14 of the sleeve 6 are joined. Chamber 16 may be an annular chamber internal of outer wall 14 and coaxially surrounding inner wall 13.

A gas connection inlet 20 is provided along an outer side 20' of the stepped reduced-diameter portion 8 in the form of an axially extending hollow rib 21. The hollow portion of the rib 21 defines a gas communication channel 22 which at its open lower end 23 fluidly communicates with an upper end 24 of chamber 16 formed between the inner wall 13 and the outer wall 14 of the sleeve 6. The open upper end 25 of the gas communication channel 22 is adapted to be connected to a source of pressurised gas, for example, air, though any suitable gas may be used. In some circumstances a cleaning gas such as chlorine may be used as or included in the pressurized gas.

Although the gas connection inlet 20 shown in this embodiment is one preferred configuration, it will be appreciated that any suitable inlet arrangement may be used to deliver gas to the chamber 16. For example, a simple tube connected to an opening in the chamber 16 may be provided with a connector which sealingly communicates gas from a gas source to the chamber. A variety of gas connectors may be used, for example, screw threaded, clipped or flexible push-on tubing.

The inner wall 13 of the sleeve 6 is provided with one or more aeration openings 26 defined in the inner wall 13 of the sleeve 6 for communicating gas from the chamber 16 to an inner side 27 of the inner wall 13. The aeration openings 26 are configured to provide fluid communication between the chamber 16 and membranes 34 of the membrane filtration module 7. The openings 26 are located below the upper end 19 of the chamber 16. In this embodiment, a plurality of openings 26 is circumferentially spaced around the periphery of the inner wall 13. It will be appreciated that any form of suitable opening may be used to provide fluid communication of gas between the chamber 16 and the inner side 27 of the inner wall 13.

In some embodiments, the openings 26 in the inner wall 13 are formed by open-ended upwardly extending slots. The slots 26 are tapered in width from their lower open ends 28 to their closed upper ends 29. In some embodiments, the taper is stepped, with an initial taper along part of the lower portion of the slot then an inward step (not shown) of reduced width and a further taper from the step to the upper end of the slots 29. It will be appreciated that other forms of opening may be used, for example, a group of vertically spaced slots or holes. The size of the slots or holes may be configured to reduce along the vertical extent of the group of the slots or holes to achieve a similar function to the tapering of a single slot.

The outer wall 14 of the sleeve 6 is provided with one or more drain openings 31. The one or more drain openings are defined in the outer wall 14 of the sleeve 6 and are configured to provide fluid communication between the membranes 34 of the membrane filtration module 7 and an outside of the sleeve 6. In some embodiments, the drain opening or openings 31 are located below the lower ends of the slots 26 formed in the inner wall 13. Further, in some embodiments, the drain openings 31 comprise a plurality of circumferentially spaced openings in the outer wall 14. The size and shape of the drain openings is not narrowly critical, though it is preferred they be configured to provide effective draining of liquid therethrough. In some embodiments, the drain openings 31 are each located at the same distance from the bottom of the sleeve 6 and are identical in size and shape. In other embodiments one or more of the drain openings 31 may differ in one or more of size, shape, and/or distance from the bottom of the sleeve 6 than one or more other of the drain openings 31.

As best shown in FIG. 2, in this embodiment, the inner wall 13 has a stepped downward extent. Portions 30 of the inner wall 13 extend further downward along the length of the outer wall 14 than portions 30' of the inner wall 13. Portions 30 of the inner wall 13 extend to below upper portions of the drain openings 31 in the outer wall 14 and terminate below an upper extent of one or more or each of the drain openings 31. Portions 30' of the inner wall 13 having the upwardly extending slots 26 only extend downward to above the drain openings 31 in the outer wall 14 and terminate above the upper extent of one or more or each of the drain openings 31. The upwardly extending slots 26 defined between the portions 30 of the inner wall 13 have lower ends 28 located above the upper extents of the drain openings 31. The upwardly extending slots 26 defined adjacent the portions 30' of the inner wall 13 have lower ends 28 located below the upper extents of the drain openings 31.

Figure 3:
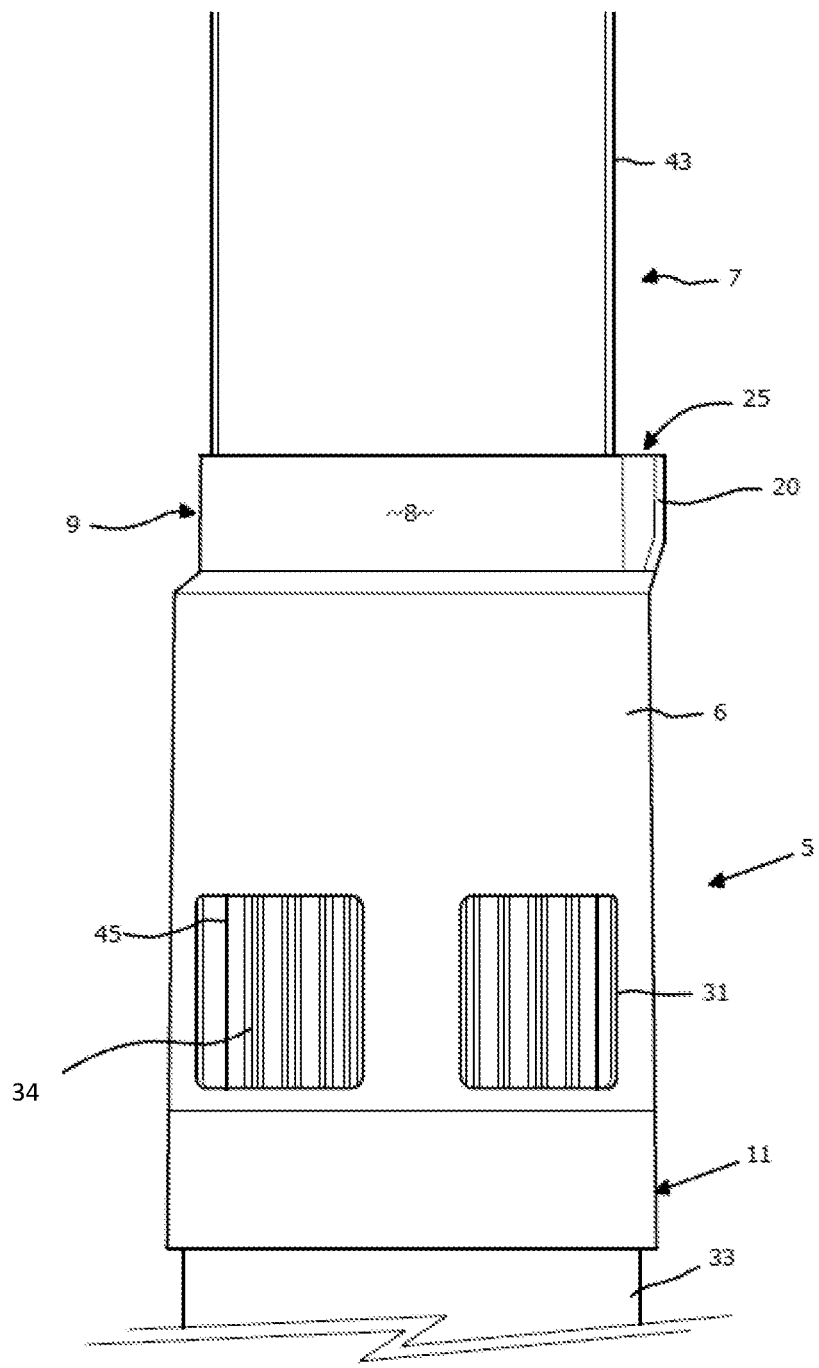
FIG. 3 is a side elevation view of the aeration device of FIG. 1 when fitted to a membrane filtration module.

FIG. 3 shows the aeration device 5 fitted to the lower end of the membrane filtration module 7. The lower portion 11 of the sleeve 6 extends beyond a lower potting head 32 of the membrane filtration module 7 and extends upwardly along the outer extent of the module 7. In this embodiment, the upper end 9 of the sleeve 6 engages with a fluid retention sleeve 43 which extends at least part way along the length of the module 7 to retain fluid, including gas bubbles and liquid, around the membranes 34. It will be appreciated the use of a fluid retention sleeve 43 is not narrowly critical to the operation of the device and is merely preferable in some implementations. In some embodiments, a perforated screen structure 45 may be provided which surrounds the membranes 34 and may be fitted between the membranes 34 and the fluid retention sleeve 43. The perforated screen structure 45 may be provided in addition to or as an alternative to the fluid retention sleeve 43. When used, this screen structure 45 may serve a number of purposes including preventing damage to the membranes 34 during handling of the sub-modules and supporting the spaced upper and lower potting heads 32. The internal threaded portion 10 at the lower portion of the sleeve 6 engages with a complimentary threaded portion 44 of a lower filtrate collection conduit or manifold 33. Both the aeration openings 26 and the drain openings 31 in the sleeve 6 are in fluid communication with membranes 34 mounted in the membrane filtration module 7. The aeration openings 26 provide fluid communication between the membranes 34 and the chamber 16. The drain openings 31 provide fluid communication between the membranes 34 and an area outside of the filtration module, for example, a tank, vessel, or other structure in which the membrane filtration module 7 may be mounted.

Referring to FIGS. 4 to 7, one embodiment is shown where the membrane filtration modules 7 are vertically mounted in a rack module array 35.

Figure 4:
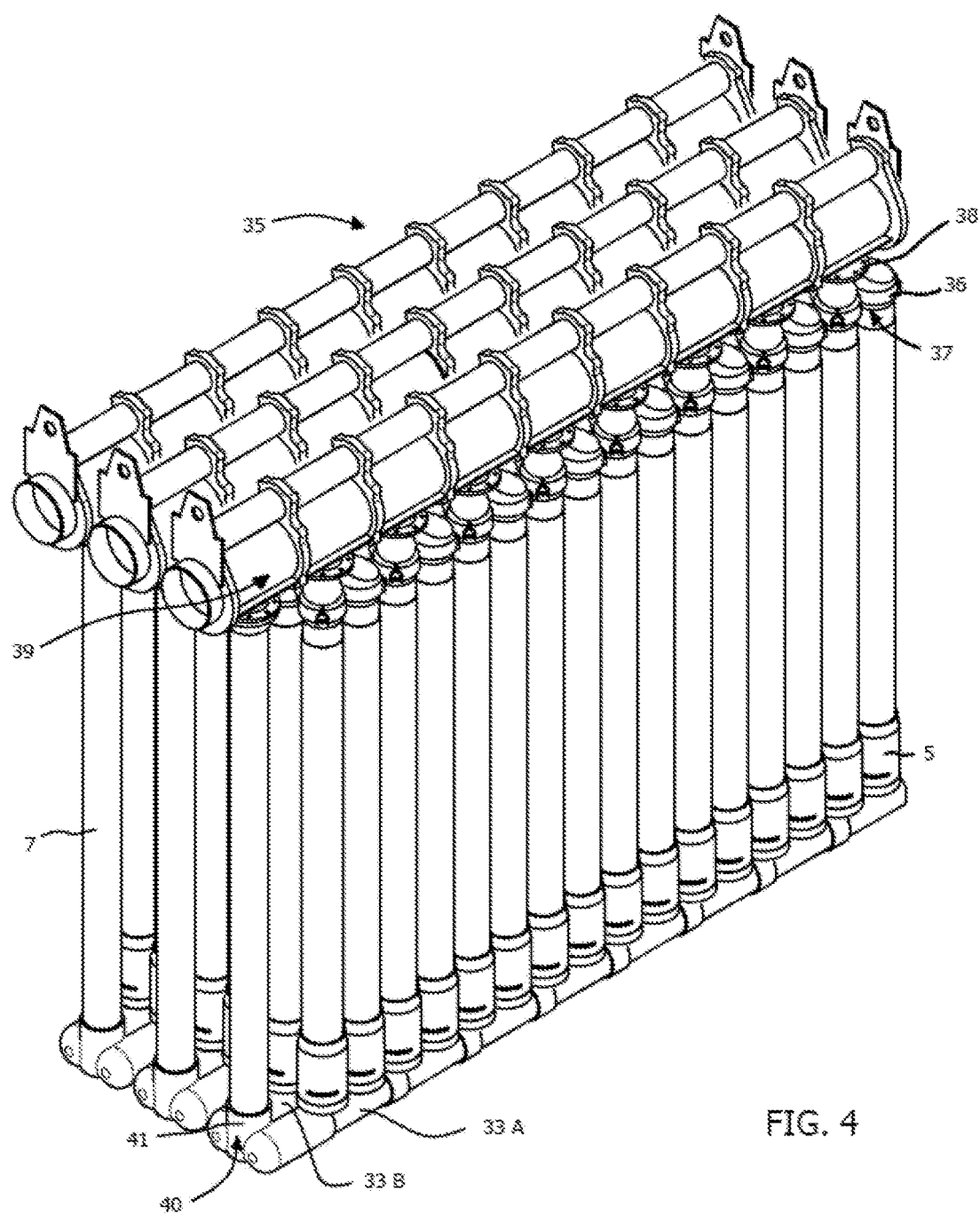
FIG. 4 shows a top perspective view of a membrane filtration module rack according to one embodiment.

FIG. 4 shows one embodiment of a rack mounted membrane filtration module array 35. The modules 7 are arranged in groups comprising pairs of modules vertically extending between a corresponding pair of lower filtrate collection manifolds 33A and 33B that extend along the length of the rack and an upper clover headpiece 36, which receives the upper ends 37 of two pairs of membrane filtration modules 7. The upper end 38 of each clover headpiece 36 is in sealing fluid communication with an upper filtrate collection manifold 39 which extends along the length of the rack array 35 generally parallel to the lower filtrate collection manifolds 33A, 33B. FIG. 4 shows three rows of the module groups forming a rack module array 35, though it will be appreciated the arrangement of modules and the number in a group and the number of rows of modules is non-critical and may be configured to meet the requirements for any particular installation.

The membrane module 7 may comprise a plurality of membranes 34 extending between spaced upper and lower potting heads 32. Further, the membranes 34 may comprise permeable, hollow fibre membranes. The permeable hollow fibre membranes may be arranged in bundles extending between the potting heads 32. The membranes 34 may be open at one or both ends to allow removal of filtrate therefrom. The membrane filtration modules 7 are typically, in use, located in a tank or vessel 46 open to atmosphere and filtrate is withdrawn by applying a vacuum or negative pressure to the lumens of the membranes 34.

At least one of each of the lower filtrate collection manifolds 33A, 33B is fluidly coupled to a double-elbowed tee-piece 40 having upwardly extending filtrate transfer conduit 41, which is fluidly coupled to a corresponding upper filtrate collection manifold 39 to fluidly communicate filtrate between the lower filtrate collection manifold 33A, 33B and the upper filtrate collection manifold 39. It will be appreciated that the double-elbowed tee-pieces 40 can be provided at one or both ends of the lower filtrate collection manifolds 33A, 33B dependent on system requirements. Similarly, filtrate can be removed from either or both the upper and lower filtrate collection manifolds, though it is typically removed from the upper filtrate collection manifolds 39.

Figure 5:
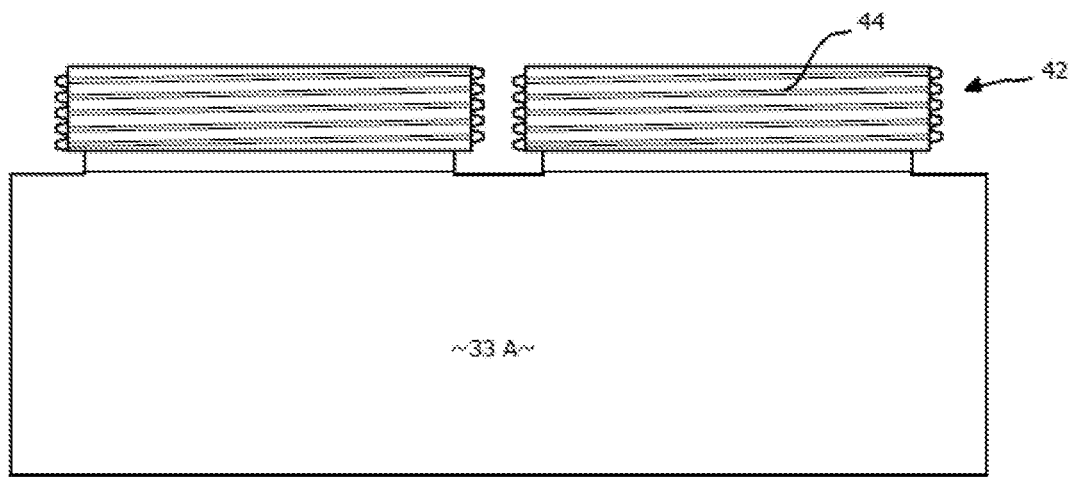
FIG. 5 shows a front elevation view of a portion of a filtrate manifold according to one embodiment.

FIG. 5 shows a detailed view of the lower connection between a lower filtrate manifold 33A and the base of each membrane filtration module 7. The lower filtrate manifold 33A is provided with upwardly extending tubular opening 42 having an externally threaded portion 44 for engagement with the internal threaded portion 10 of the aeration device sleeve 6 of the membrane filtration module 7. It will be appreciated that this embodiment of the connection is not narrowly critical and any suitable form of fluid connection may be used. For example, a clip type or push-fit engagement with sealing members such as O-rings or the like may be used. Further, the sleeve 6 could be directly fitted into the side of the manifold without the use of the tubular opening or have a fitting which clamps to the outside wall of the filtrate collection manifold about an opening therein. In one embodiment, a saddle type fitting (not shown) sits astride the tubular filtrate manifold adjacent an opening therein. The saddle type fitting having an upwardly extending tubular conduit with an externally threaded portion adapted to be engaged with the internal threaded portion 10 of the sleeve 6. The saddle of the fitting may be fixed to the lower filtrate manifold by clamping, adhesive or any other suitable means.

Figure 6:
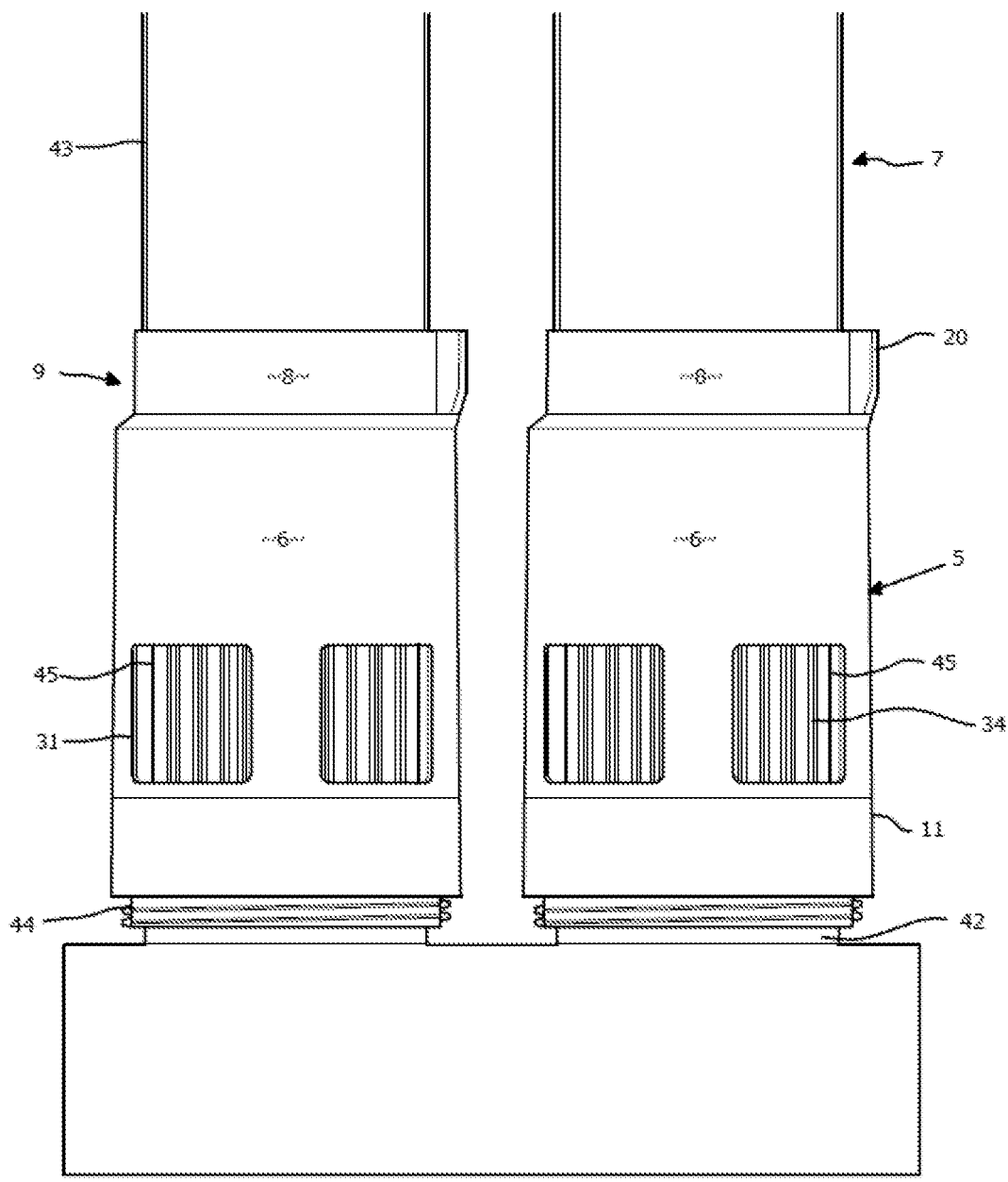
FIG. 6 shows a front elevation view of the lower portion of two membrane filtration modules connected to the filtrate manifold according to one embodiment.
Figure 7:
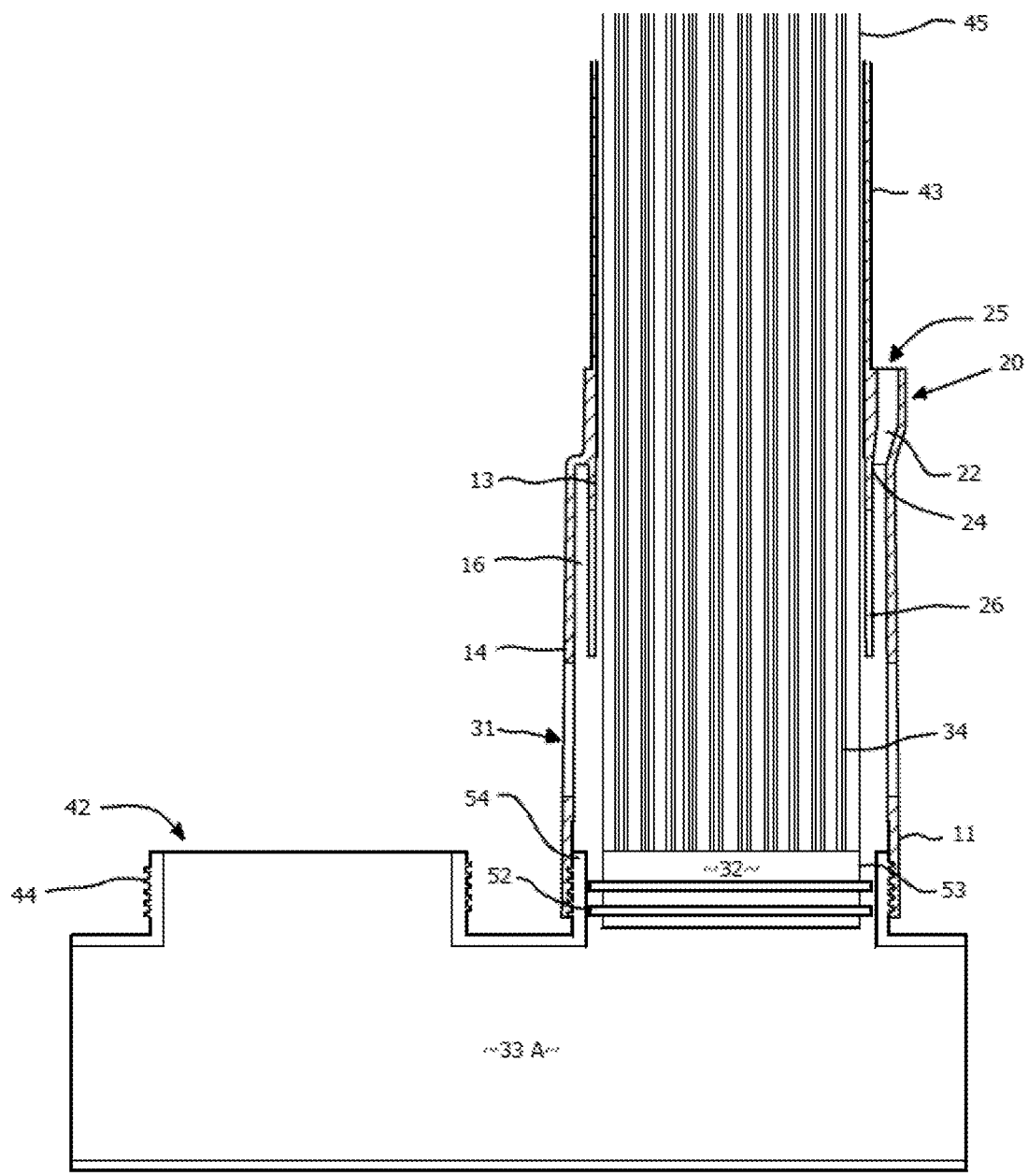
FIG. 7 shows a section side elevation view of the lower portion of one membrane filtration module connected to the filtrate manifold according to one embodiment.

FIGS. 6 and 7 show side elevation views of the base of membrane module 7 and the aeration device sleeve 6. In this embodiment, the internally threaded portion 9 of the lower portion of the aeration device sleeve 6 engages with the external threaded portion 44 of the tubular opening 42 of the lower filtrate manifold 33A. As best shown on FIG. 7, when the aeration device sleeve 6 is fully engaged with the lower filtrate manifold 33A, the membranes 34 supported in the lower potting head 32 are in fluid communication with the lower filtrate manifold 33A. The lower potting 32 is sealingly engaged with the lower filtrate manifold 33A to provide fluid communication of filtrate passing out of the open ends of membranes 34 supported in the lower potting head 32. In this embodiment, the sealing engagement is provided by a set of sealing members 52, for example, O-rings or the like, positioned between the outer surface 53 of the potting head 32 and the inner surface 54 of the tubular opening 42. It will be appreciated the type of sealing engagement is not narrowly critical and any suitable form of fluid sealing between the potting head 32 and the lower filtrate manifold 33A may be used to enable the filtrate collected from the membranes to be transferred to the lower filtrate manifold 33A without contamination by liquid 47 to be filtered.

The operation of one embodiment of the aeration device will now be described with reference to FIGS. 8 to 10 of the drawings.

Figure 8:
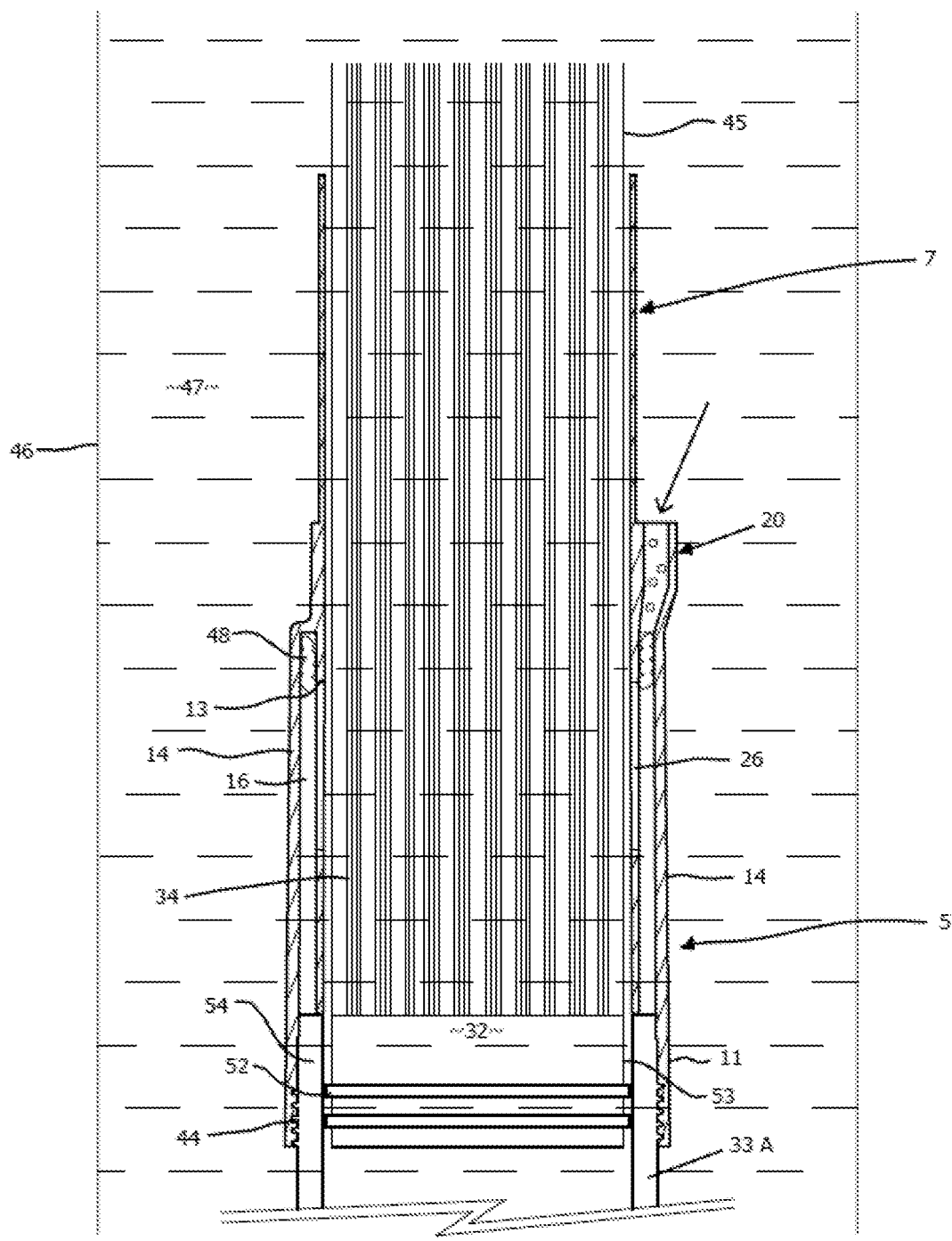
FIG. 8 is a sectional side elevation view of the aeration device of FIG. 1 when fitted to a membrane filtration module showing a plenum mode of operation of the device.

FIG. 8 shows the aeration device 5 mounted to a membrane filtration module 7 and suspended generally vertically in a vessel or tank 46 containing liquid 47 to be filtered. Initially, the aeration device 5 operates in plenum mode where gas is initially accumulated in an upper plenum region 48 of the chamber 16. Gas is fed into the chamber 16 from a source of pressurised gas (not shown), for example, by a pipe or tube connected to the gas connection inlet 20 and accumulated in the plenum region 48 of the chamber 16 above the upper end of the aeration openings 26.

Figure 9:
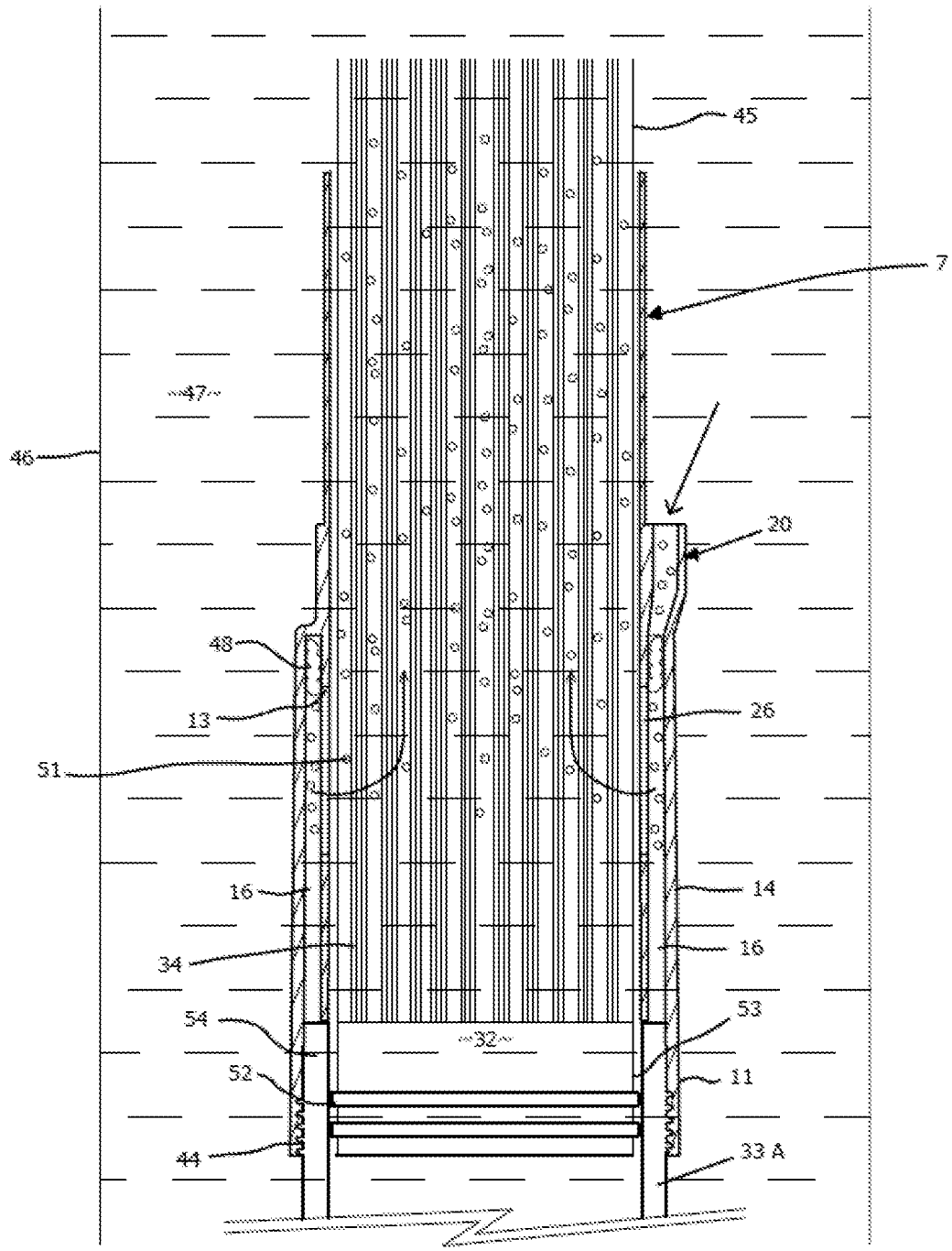
FIG. 9 is a sectional side elevation view of the aeration device of FIG. 1 when fitted to a membrane filtration module showing an aeration mode of operation of the device.

As the amount of gas within the chamber 16 increases, the aeration device 5 enters the aeration mode, as best shown in FIG. 9, where the gas in the chamber 16 passes through the aeration openings, in this embodiment slots 26, as gas bubbles 51 and into the membrane filtration module 7 to aerate the membranes 34 and clean the surface of the membranes 34. The tapered width of the aeration slots 26 serves to self regulate the gas bubble flow along the length of each slot 26 to provide a generally uniform flow of gas bubbles 51 into the membranes 34.

Figure 10:
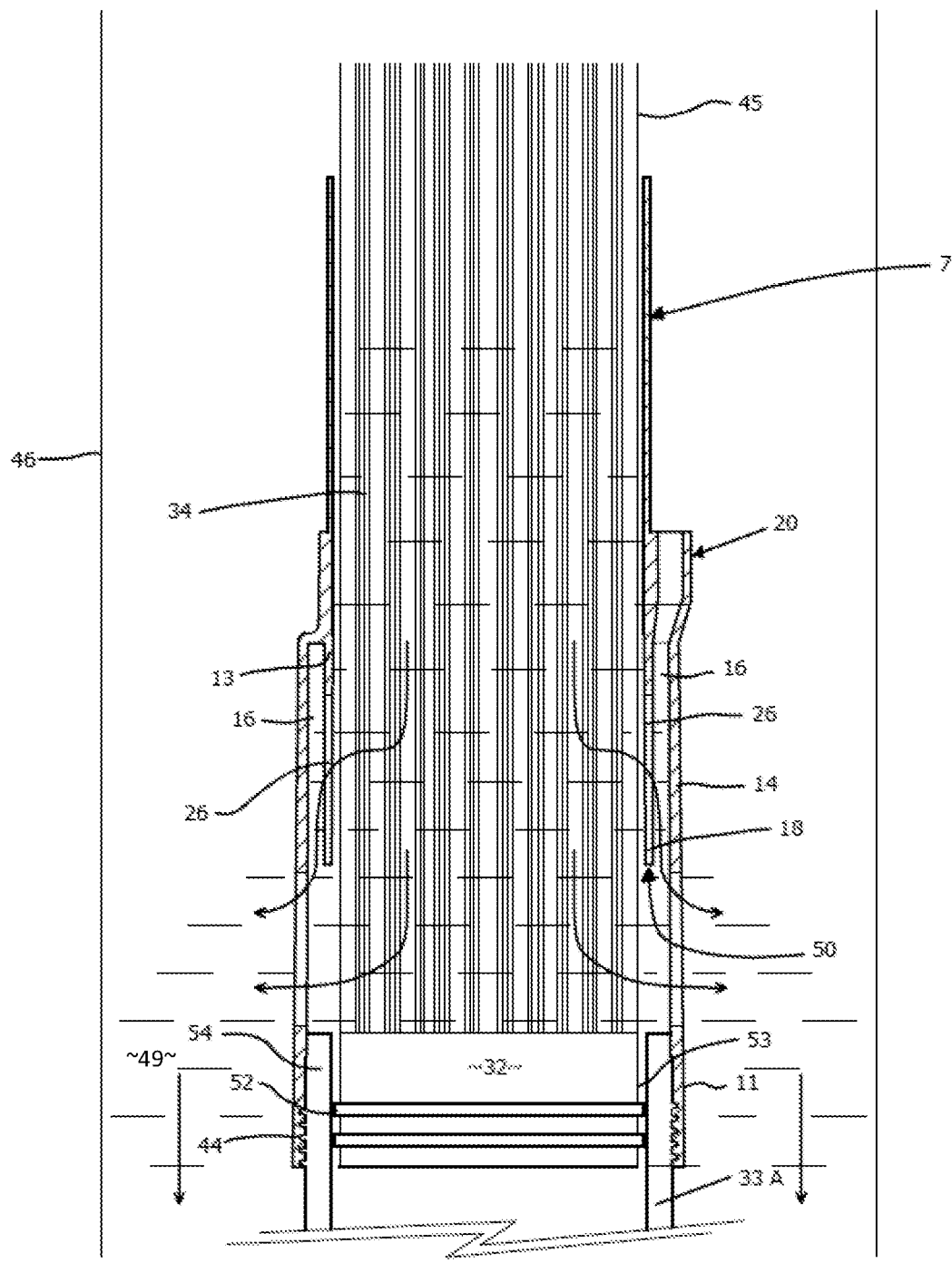
FIG. 10 is a sectional side elevation view of the aeration device of FIG. 1 when fitted to a membrane filtration module showing a drain mode of operation of the device.

As best shown in FIG. 10, once the aeration process has been completed, the flow of gas to the chamber 16 is stopped or suspended and waste liquid 49 containing the fowling substances and impurities dislodged during the aeration process is removed, drained, or pumped from the vessel or tank 46 in which the membrane filtration module 7 is located. As the waste liquid is removed from the vessel or tank 46, liquid remaining in the membrane filtration module 7 drains out through the gap 50 between the distal end 18 of the inner wall 13 of the sleeve 6 and the base of the sleeve and then through the drain openings 31 in the outer wall 14 of the sleeve 6. Liquid may also drain from the membrane filtration module 7 through the aeration openings 26 in the inner wall 13 and then through the drain openings 31 in the outer wall 14 of the sleeve 6.

To provide for initiating and suspending flow of gas to the aeration device and filling/draining of the vessel or tank, in different embodiments, a controller (not shown) may monitor parameters from various sensors within the membrane filtration system. The controller may be embodied in any of numerous forms. The monitoring computer or controller may receive feedback from sensors, for example, pressure, trans-membrane pressure, temperature, pH, chemical concentration, or liquid level sensors in the feed tank, the aeration device, or in the feed supply piping, permeate piping or other piping associated with the filtration system. In some embodiments the monitoring computer or controller may produce an output for an operator, and in other embodiments, automatically adjusts processing parameters for the filtration system, based on the feedback from these sensors. For example, a rate of flow of gas to one or more membrane filtration modules 7, and/or one or more aeration devices 5 may be adjusted by the controller.

In one example, a computerized controller for embodiments of the system disclosed herein is implemented using one or more computer systems (not shown). The computer system may be, for example, a general-purpose computer such as those based on an Intel PENTIUM® or Core™ processor, a Motorola PowerPC® processor, a Sun UltraSPARC® processor, a Hewlett-Packard PA-RISC® processor, or any other type of processor or combinations thereof. Alternatively, the computer system may include specially-programmed, special-purpose hardware, for example, an application-specific integrated circuit (ASIC) or controllers intended specifically for wastewater processing equipment.

The computer system can include one or more processors typically connected to one or more memory devices, which can comprise, for example, any one or more of a disk drive memory, a flash memory device, a RAM memory device, or other device for storing data. The memory is typically used for storing programs and data during operation of the controller and/or computer system. For example, the memory may be used for storing historical data relating to measured parameters from any of various sensors over a period of time, as well as current sensor measurement data. Software, including programming code that implements embodiments disclosed herein, can be stored on a computer readable and/or writeable non-volatile recording medium such as a hard drive or a flash memory, and then copied into memory wherein it can then be executed by a processor. Such programming code may be written in any of a plurality of programming languages, for example, Java, Visual Basic, C, C#, or C++, Fortran, Pascal, Eiffel, Basic, COBAL, or any of a variety of combinations thereof.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the spirit and scope defined by the appended claims. Accordingly, the foregoing description and drawings are by way of example only.

What is claimed is:

1. An aeration device configured to be fitted to a membrane filtration module having membranes mounted therein, the aeration device comprises:
   a sleeve configured to at least partially surround the membrane filtration module, the sleeve having one end adapted to engage with the membrane filtration module and another end adapted to engage with a filtrate collection conduit or manifold, the sleeve comprising:

an outer wall and an inner wall spaced therefrom, the inner wall and the outer wall downwardly extending co-axially from a joining portion, the outer wall and the inner wall defining a chamber therebetween having an open lower end at a distal end of the inner wall and a closed upper end at the joining portion where the inner wall and the outer wall of the sleeve are joined, a gap being defined between the distal end of the inner wall and the outer wall about an entire periphery of the inner wall;

a gas inlet distinct from the open lower end of the chamber and disposed at an upper end of the chamber between the outer and inner wall, the gas inlet configured to communicate gas from a source of gas to the chamber;

one or more aeration openings defined in the inner wall of the sleeve and configured to provide fluid communication between the chamber and the membranes of the membrane filtration module; and one or more drain openings defined in the outer wall of the sleeve and configured to provide fluid communication between the membranes of the membrane filtration module and an outside of the sleeve.

2. The aeration device of claim 1, wherein the aeration device is engaged to the filtrate collection conduit or manifold by a threading engagement between complimentary screw threads provided on the respective filtrate collection conduit or manifold and the one end of the outer wall of the sleeve.

3. The aeration device of claim 1, wherein the inner wall extends downwardly part way along a length of the outer wall of the sleeve.

4. The aeration device of claim 3, wherein a first set of portions of the inner wall extend downwardly along the length of the outer wall of the sleeve to a greater extent than a second set of portions of the inner wall extend downwardly along the length of the outer wall of the sleeve.

5. The aeration device of claim 4, wherein the first set of portions of the inner wall extend downwardly along the length of the outer wall and terminate below an upper extent of the one or more drain openings.

6. The aeration device of claim 5, wherein the second set of portions of the inner wall extend downwardly along the length of the outer wall and terminate above the upper extent of the one or more drain openings.

7. The aeration device of claim 1, wherein a plurality of aeration openings are provided in the inner wall of the sleeve, the aeration openings being circumferentially spaced from one another around the periphery of the inner wall of the sleeve.

8. The aeration device of claim 7, wherein a first set of the plurality of aeration openings have lower ends disposed below an upper extent of the one or more drain openings.

9. The aeration device of claim 8, wherein a second set of the plurality of aeration openings have lower ends disposed above an upper extent of the one or more drain openings.

10. The aeration device of claim 7, wherein the plurality of aeration openings are formed as vertically extending slots.

11. The aeration device of claim 10, wherein the slots are open at their lower ends and taper inwardly towards upper closed ends of the slots.

12. The aeration device of claim 11, wherein the taper is stepped with an initial taper along part of a lower portion of the slot then an inward step of reduced width and a further taper from the step to the upper end of the slot.

13. The aeration device of claim 1, wherein the gas inlet is provided at the joining portion of the sleeve.

14. The aeration device of claim 1, wherein the one or more drain openings include a plurality of circumferentially spaced drain openings defined in the outer wall of the sleeve.

15. A membrane filtration system comprising a plurality of vertically extending membrane filtration modules mounted in a rack, each membrane filtration module including membranes in fluid communication with upper and lower filtrate collection manifolds, wherein each membrane module is provided with an aeration device according to claim 1 and wherein the aeration device is engaged with the lower filtration collection manifold.

16. The aeration device of claim 1, wherein the one or more drain openings are configured to provide fluid communication between the membranes of the membrane filtration module and an internal volume of a vessel in which the membrane filtration module is configured to be mounted.

* * * * *